US012756796B2

(12) United States Patent
Furry et al.

(10) Patent No.: US 12,756,796 B2
(45) **Date of Patent: *Oct. 6, 2026**

(54) OPTICAL GAS IMAGING CAMERA WITH NAVIGATION AND TARGETING CONTROL, LEARNING AND OPERATING METHODS FOR THE CAMERA, AND COMPLIANCE AUDITING SYSTEM

(71) Applicant: ChampionX LLC, Sugar Land, TX (US)

(72) Inventors: David Furry, Early, TX (US); Paul Bonner, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,846

(22) Filed: Dec. 12, 2024

(65) Prior Publication Data

US 2025/0133188 A1 Apr. 24, 2025

Related U.S. Application Data

(63) Continuation of application No. 18/625,860, filed on Apr. 3, 2024, now Pat. No. 12,207,022.

(Continued)

(51) Int. Cl.

*H04N 7/18* (2006.01)
*G06T 7/00* (2017.01)

(Continued)

(52) U.S. Cl.

CPC ........... *H04N 7/181* (2013.01); *G06T 7/0002* (2013.01); *G06T 7/74* (2017.01); *G06T 11/00* (2013.01);

(Continued)

(58) Field of Classification Search

CPC .... G01M 3/38; G01M 13/028; G01M 13/045; G01M 3/04; G01M 3/24; G01C 21/16;

(Continued)

(56) References Cited

U.S. PATENT DOCUMENTS 5,721,430 A 2/1998 Wong
6,574,031 B1 6/2003 Sachse (Continued)

FOREIGN PATENT DOCUMENTS

WO 2008/079762 7/2008

OTHER PUBLICATIONS

Li et al, "A Fire Reconnaissance Robot Based on SLAM Position, Thermal Imaging Technologies, and AR Display," published on Nov. 18, 2019, retrieved from https://doi.org/10.3390/s19225036, 22 pages.

(Continued)

*Primary Examiner* — Masum Billah
(74) *Attorney, Agent, or Firm* — Keith C. Rawlins, Esq.; Scheef & Stone, L.L.P.

(57) ABSTRACT

An optical gas imaging camera, methods of operating the optical gas imaging camera in a learning mode and in an operating mode, and a compliance auditing system are disclosed, where the optical gas imaging camera has on-board hardware, devices, and software used for generating images of fugitive emissions of a target object along with generating a multitude of other information associated with the time of generating images of the target object, which is all combined into compliance data that can be stored on-board the optical gas imaging camera or transmitted to a central computer in the auditing system. The compliance data is stored and can be retrieved to add additional information such as repair of a fugitive emission or for compliance auditing purposes.

17 Claims, 9 Drawing Sheets

Related U.S. Application Data

(60) Provisional application No. 63/579,512, filed on Aug. 29, 2023, provisional application No. 63/493,945, filed on Apr. 3, 2023.

(51) Int. Cl.

| | |
|---|---|
| ***G06T 7/73*** | (2017.01) |
| ***G06T 11/00*** | (2006.01) |
| ***H04N 5/265*** | (2006.01) |
| ***H04N 23/11*** | (2023.01) |

(52) U.S. Cl.
CPC ............ *H04N 5/265* (2013.01); *H04N 23/11* (2023.01); *G06T 2207/10048* (2013.01); *G06T 2207/20212* (2013.01); *G06T 2207/30244* (2013.01)

(58) Field of Classification Search
CPC G01C 3/02; G06F 18/40; G06T 11/00; G06T 2207/10012
USPC ........................................................ 348/159
See application file for complete search history.

(56) References Cited

U.S. PATENT DOCUMENTS

| | | | |
|---|---|---|---|
| 6,635,875 | B1 | 10/2003 | Bley et al. |
| 6,937,324 | B2 | 8/2005 | Kameoka |
| 8,242,445 | B1 | 8/2012 | Scanlon et al. |
| 8,426,813 | B2 | 4/2013 | Furry |
| 9,635,284 | B2 | 4/2017 | Benson et al. |
| 9,726,543 | B2 | 8/2017 | Zeng |
| 10,371,627 | B2 | 8/2019 | Waxman et al. |
| 10,677,771 | B2 | 6/2020 | Dittberner et al. |
| 10,684,216 | B2 | 6/2020 | Wang |
| 10,809,148 | B2 | 10/2020 | Yanai et al. |
| 10,810,858 | B2 | 10/2020 | Israelsen |
| 10,852,208 | B2 | 12/2020 | Wang |
| 11,197,065 | B2 | 12/2021 | Hirata |
| 11,386,530 | B2 | 7/2022 | Wijk |
| 11,422,030 | B2 | 8/2022 | McQuilkin et al. |
| 11,438,554 | B2 | 9/2022 | O'Neill et al. |
| 11,598,878 | B2 | 3/2023 | Mahajan et al. |
| 2005/0134859 | A1 | 6/2005 | Kalayeh et al. |
| 2007/0241280 | A1 | 10/2007 | Dainobu et al. |
| 2012/0078417 | A1 | 3/2012 | Connell, II et al. |
| 2015/0009325 | A1 | 1/2015 | Kardashov |
| 2018/0052072 | A1 | 2/2018 | Koh |
| 2018/0172820 | A1 | 6/2018 | Rhead et al. |
| 2018/0261012 | A1 | 9/2018 | Mullins et al. |
| 2019/0003919 | A1 | 1/2019 | Asano et al. |
| 2019/0056792 | A1 | 2/2019 | Wan et al. |
| 2020/0025679 | A1 | 1/2020 | Nygren et al. |
| 2020/0363327 | A1 | 11/2020 | Cox |
| 2021/0218909 | A1* | 7/2021 | Schmidt ............... H04N 25/677 |
| 2021/0310857 | A1 | 10/2021 | Stuart et al. |
| 2021/0318236 | A1* | 10/2021 | Sun ......................... G06F 18/40 |
| 2022/0214172 | A1 | 7/2022 | Dooley et al. |
| 2022/0221398 | A1 | 7/2022 | Aker et al. |
| 2022/0244127 | A1 | 8/2022 | Aubrey et al. |
| 2024/0333879 | A1 | 10/2024 | Furry et al. |

OTHER PUBLICATIONS

Barber et al., "Design of an Infrared Imaging System for Robotic Inspection of Gas Leaks in Industrial Environments," International Journal of Advanced Robotic Systems, retrieved from https://doi.org/10.5772/60058, Jan. 1, 2015, 12 pages.

Kumar, "Development of SLAM Algorithm for a Pipe Inspection Serpentine Robot," retrieved from https://essay.utwente.nl/80207/1/Final_version_Kumar.pdf, Robotics and Mechatronics EEMathCS, University of Twente, Nov. 2019, 77 pages. (Uploaded in the parts NPL-3-part1; NPL-3-part2 and NPL3-part3).

Handheld Optical Gas Imaging (OGI) Cameras, retrieved from https://www.opgal.com/handheld-optical-gas-imaging-ogi-cameras/ on Jan. 3, 2023, 2 pages.

Gomes et al., "IoT-Enabled Gas Sensors: Technologies, Applications, and Opportunities," Journal of Sensor and Actuator Networks, retrieved from https://essay.utwente.nl/80207/1/Final_version_Kumar.pdf, Dec. 13, 2019, 29 pages.

Niatros, "Niatros Optical Gas Imaging MWIR Camera Cores", retrieved from https://ircameras.com/wp-content/uploads/2014/10/IRC-Niatros-2018.pdf, 2 pages.

Aitken et al., "Simultaneous Localization and Mapping for Inspection Robots in Water and Sewer Pipe Networks: A Review," retrieved fron https://ieeexplore.ieee.org/abstract/document/9548901, vol. 9, Sep. 27, 2021, 26 pages.

Flir, "Thermal imaging cameras for optical gas imaging [OGI]," retrieved from http://www.flirmedia.com/MMC/THG/Brochures/T820433/T820433_EN.pdf, Apr. 202, 28 pages.

Hansen et al., "Visual mapping for natural gas pipe inspection," retrieved from https://doi.org/10.1177/0278364914550133, The International Journal of Robotics Research, 2015, 27 pages.

Furry et al., "Low-cost lightweight airborne laser-based sensors for pipeline leak detection and reporting," May 29, 2013, retrieved from https://www.spiedigitallibrary.org/conference-proceedings-of-spie/8726/1/Low-cost-lightweight-airborne-laser-based-sensors-for-pipeline-leak/10. 1117/12.2015813.short?SSO=1, 3 pages. Abstract.

International Searching Authority, "International Search Report and Written Opinion," issued in connection with PCT patent application No. PCT/US2024/022846, mailed on Aug. 23, 2024, 19 pages.

* cited by examiner

OPTICAL GAS IMAGING CAMERA WITH NAVIGATION AND TARGETING CONTROL, LEARNING AND OPERATING METHODS FOR THE CAMERA, AND COMPLIANCE AUDITING SYSTEM

CROSS-REFERENCE TO RELATED APPLICATIONS

This application is a continuation of U.S. Non-Provisional patent application Ser. No. 18/625,860, filed on Apr. 3, 2024, and entitled "Optical Gas Imaging Camera with Navigation and Targeting Control, Learning and Operating Methods for the Camera, and Compliance Auditing System," which is incorporated by reference in its entirety.

U.S. Non-Provisional patent application Ser. No. 18/625,860 claims the benefit of and priority to U.S. Provisional Patent Application No. 63/493,945, filed on Apr. 3, 2023, and entitled "Optical Gas Imaging Camera with Navigation and Targeting Control, Learning and Operating Methods for the Camera, and Compliance Auditing System," which is incorporated by reference in its entirety.

U.S. Non-Provisional patent application Ser. No. 18/625,860 also claims the benefit of and priority to U.S. Provisional Patent Application No. 63/579,512, filed on Aug. 29, 2023, and entitled "Optical Gas Imaging Camera with Navigation and Targeting Control, Learning and Operating Methods for the Camera, and Compliance Auditing System," which is incorporated by reference in its entirety.

FIELD OF THE DISCLOSURE

The present disclosure generally relates to optical gas imaging cameras, the detection of fugitive emissions, and a system that promotes increased efficiency and accuracy of optical gas imaging cameras complying with fugitive emissions monitoring regulations.

BACKGROUND

Government regulations are becoming increasingly stringent with respect to fugitive emissions detection and reporting in a variety of industries. In some industries, such as the oil and gas and chemical industries, fugitive emission sources may include leaks, such as a leak from a valve, pipe, flange, connectors, pump, compressor, or vessel. Leak detection and repair ("LDAR"), including the leak detection and repair of leaks for fugitive emissions, can be subject to government regulations for facilities operated in the United States and outside the United States. Those regulations set forth requirements for identifying and responding to leaks in a manner that allows outside parties (e.g., regulators) to review and confirm accurate record keeping for LDAR.

For example, the United States has set forth guidelines promulgated through the Environmental Protection Agency (EPA) that require operators to meet certain goals for reducing the amounts of greenhouse gases emitted through certain operations, including for example, upstream, midstream and downstream operations, among others. Along with requiring actions for operators in these industries to reduce the amount of fugitive emissions, the associated governmental regulations also require more stringent LDAR reporting.

These more stringent reporting requirements for fugitive emissions detection have created the need for new apparatus and techniques for detecting and reporting fugitive emissions.

SUMMARY

Disclosed is an optical gas imaging camera that includes: a housing; a digital encoder contained in the housing; a mid-wave infra-red (MWIR) camera contained in the housing and connected to the digital encoder, wherein the MWIR camera is configured to output a captured infrared image of a target object to the digital encoder; a visible light camera contained in the housing and connected to the digital encoder, wherein the visible light camera is configured to output a captured visible light image of the target object to the digital encoder; a system on module (SOM) contained in the housing; a light detection and ranging (LIDAR) sensor contained in the housing and configured to i) determine a distance between the target object and the optical gas imaging camera and ii) output a distance measurement signal containing distance data associated with the captured infrared image and the captured visible light image to the SOM; a temperature sensor contained in the housing and configured to i) measure a temperature at the optical gas imaging camera and ii) output a temperature signal containing temperature data associated with the captured infrared image and the captured visible light image to the SOM; an inertial measurement unit (IMU) contained in the housing and configured to i) determine an orientation of the optical gas imaging camera and ii) output an orientation signal containing pose data associated with the captured infrared image and the captured visible light image to the SOM; a geographic position device contained in the housing and configured to i) determine a geographic location or position of the optical gas imaging camera and ii) output a geographic position signal containing geographic position data associated with the captured infrared image and the captured visible light image to the SOM; wherein the SOM is configured to send the distance data, the temperature data, the pose data, and the geographic position data that are associated with the captured infrared image and the captured visible light image to the digital encoder, wherein the digital encoder is configured to i) encode a) the captured infrared image, b) the captured visible light image, and c) the distance data, the temperature data, the pose data, and the geographic position data that are associated with the captured infrared image and the captured visible light image into an encoded data, and ii) send the encoded data to the SOM.

Disclosed is another optical gas imaging camera that includes: a housing; a mid-wave infra-red (MWIR) camera contained in the housing, wherein the MWIR camera is configured to capture a captured infrared image of a target object; a visible light camera contained in the housing, wherein the visible light camera is configured to i) capture, at a first time, a reference visible light image of the target object and ii) capture, at a second time that is after the first time, a captured visible light image of the target object; a light detection and ranging (LIDAR) sensor contained in the housing and configured to i) determine, at the first time, a reference distance between the target object and the optical gas imaging camera and ii) determine, at the second time, an operating distance between the target object and the optical gas imaging camera; an inertial measurement unit (IMU) contained in the housing and configured to i) determine, at the first time, a reference pose of the optical gas imaging camera and ii) determine, at the second time, an operating pose of the optical gas imaging camera; and a geographic position device contained in the housing and configured to i) determine, at the first time, a reference geographic location or position of the optical gas imaging camera and ii)

determine, at the second time, an operating geographic location or position of the optical gas imaging camera.

Disclosed is another optical gas imaging camera that includes: a housing; a visible light camera contained in the housing and configured to i) capture, at a first time, a reference visible light image of a target object and ii) capture, at a second time that is after the first time, a captured visible light image of the target object; a geographic position device contained in the housing and configured to i) determine, at the first time, a reference geographic location or position of the optical gas imaging camera and ii) determine, at the second time that is later than the first time, an operating geographic location or position of the optical gas imaging camera; and a system on module (SOM) contained in the housing, connected to the geographic position device, and configured to: determine a first stage comparison of the reference geographic location or position with the operating geographic location or position; and output, based on the first stage comparison, to a viewfinder or a computer device networked with the optical gas imaging camera, one or more first augmented reality object on the captured visible light image, wherein the one or more first augmented reality object is indicative of a direction to an observation point for a target object relative to the operating geographic location or position of the optical gas imaging camera.

Disclosed is an optical gas imaging system that includes: an optical gas imaging camera; and a navigation base station configured to i) determine geographic position error correction data and ii) send the geographic position error correction data to the optical gas imaging camera, wherein the optical gas imaging camera is configured to receive the geographic position error correction data and apply the geographic position error correction data to determine a geographic location or position of the optical gas imaging camera.

Disclosed is a geographic positioning assistance system for an optical gas imaging camera, the system including: a navigation base station configured to i) determine geographic position error correction data and ii) send the geographic position error correction data to the optical gas imaging camera.

Also disclosed is a method that includes: capturing, by an optical gas imaging camera, an infrared image and a visible light image of a target object; determining, by the optical gas imaging camera, a distance data between the target object and the optical gas imaging camera; measuring, by the optical gas imaging camera, a temperature data at the optical gas imaging camera; determining, by the optical gas imaging camera, pose data of the optical gas imaging camera; determining, by the optical gas imaging camera, geographic position data of the optical gas imaging camera; and encoding, by the optical gas imaging camera, the captured infrared image, the captured visible light image, the distance data, the temperature data, the pose data, and the geographic position data into an encoded data stream or encoded data packet; wherein each of the distance data, the temperature data, the pose data, and the geographic position data is associated with the captured infrared image and the captured visible light image.

Disclosed is another method that includes: capturing, by an optical gas imaging camera, an infrared image of a target object; capturing, by the optical gas imaging camera at a first time, a reference visible light image of the target object; capturing, by the optical gas imaging camera at a second time that is after the first time, a captured visible light image of the target object; determining, by the optical gas imaging camera at the first time, a reference distance between the target object and the optical gas imaging camera, a reference pose of the optical gas imaging camera, and a reference geographic location or position of the optical gas imaging camera; and determining, by the optical gas imaging camera at the second time, an operating distance between the target object and the optical gas imaging camera, an operating pose of the optical gas imaging camera, and an operating geographic location or position of the optical gas imaging camera.

Another method includes: determining, by an optical gas imaging camera, a first stage comparison of a reference geographic location or position of the optical gas imaging camera determined at a first time with an operating geographic location or position of the optical gas imaging camera determined at a second time that is later than the first time; and based on the first stage comparison, outputting or displaying, by the optical gas imaging camera to a viewfinder or a computer device connected to the optical gas imaging camera, one or more first augmented reality object on a captured visible light image, wherein the one or more first augmented reality object is indicative of a direction to an observation point for a target object relative to a geographic position of the optical gas imaging camera.

Also disclosed is method for operating a fugitive emissions compliance system, the method including: encoding, by an optical gas imaging camera, a captured infrared image, a captured visible light image, distance data, temperature data, pose data, and geographic position data into an encoded data stream or encoded data packet; transmitting, by an optical gas imaging camera, compliance data including the encoded data stream or the encoded data packet to a central computer; receiving, by the central computer, the compliance data from the optical gas imaging camera; and storing, by the central computer, the compliance data.

Also disclosed is a method that includes: determining, by a navigation base station, a geographic position error correction data; and sending, by the navigation base station, the geographic position error correction data to an optical gas imaging camera.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1A:
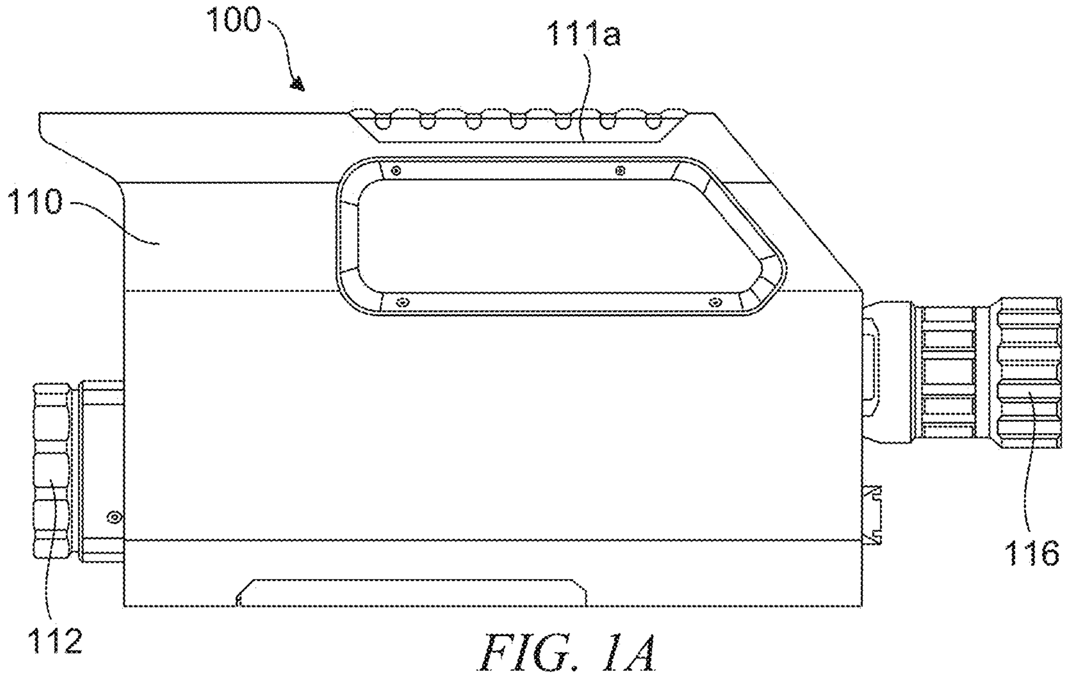
FIG. 1A is a side elevational view of an embodiment of an optical gas imaging (OGI) camera disclosed herein.
Figure 1B:
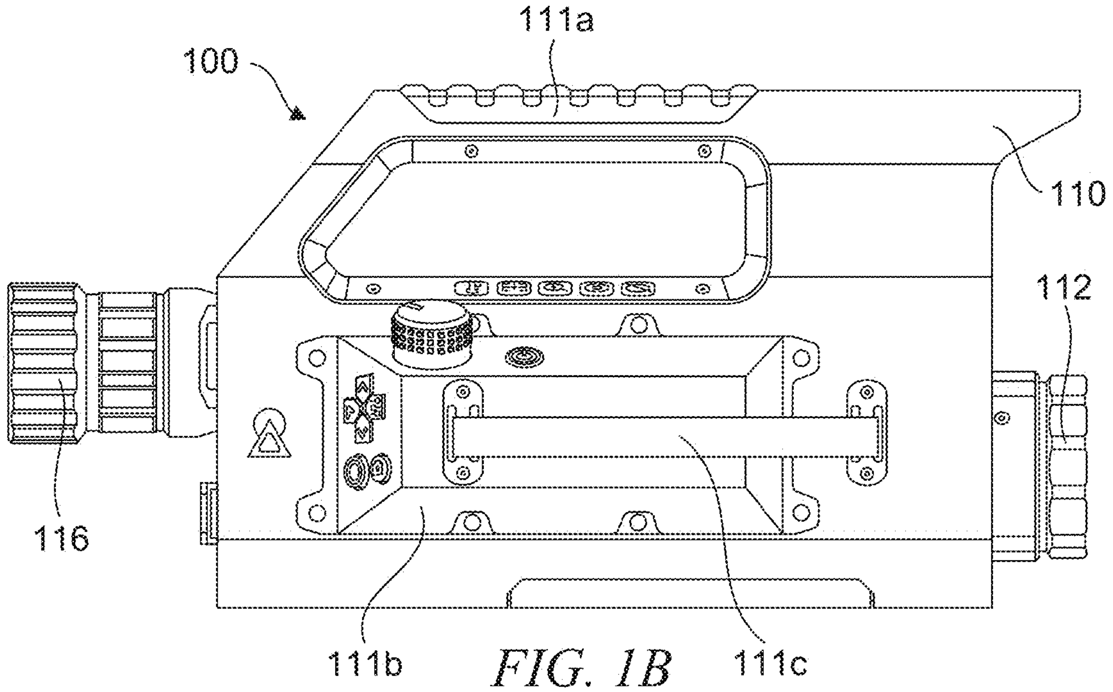
FIG. 1B is an opposite side elevational view of an embodiment of the OGI camera.
Figure 1C:
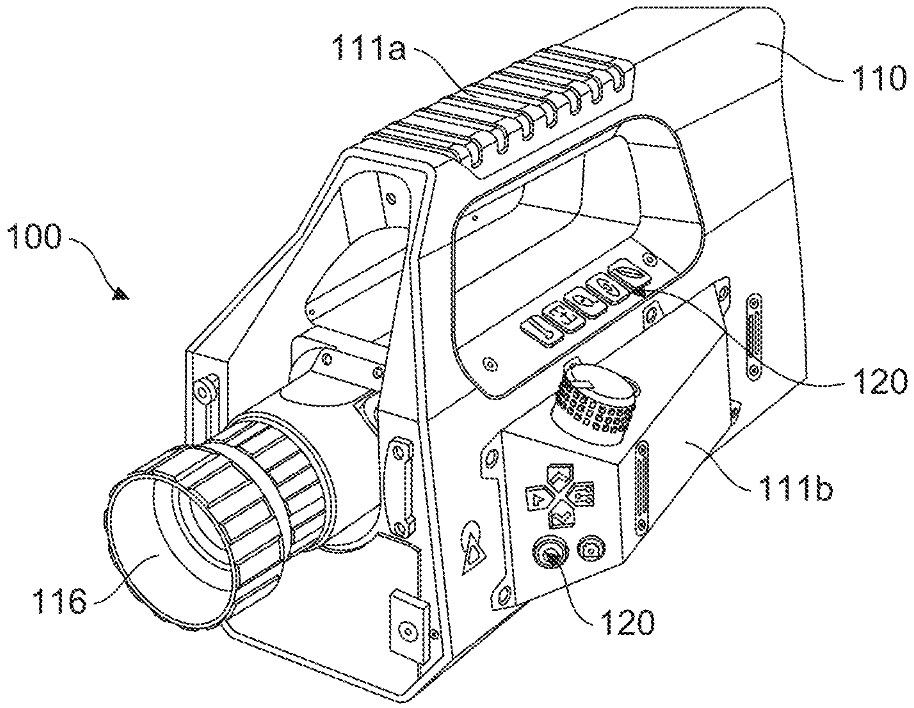
FIG. 1C is a perspective view of an end and the side of the OGI camera.
Figure 1D:
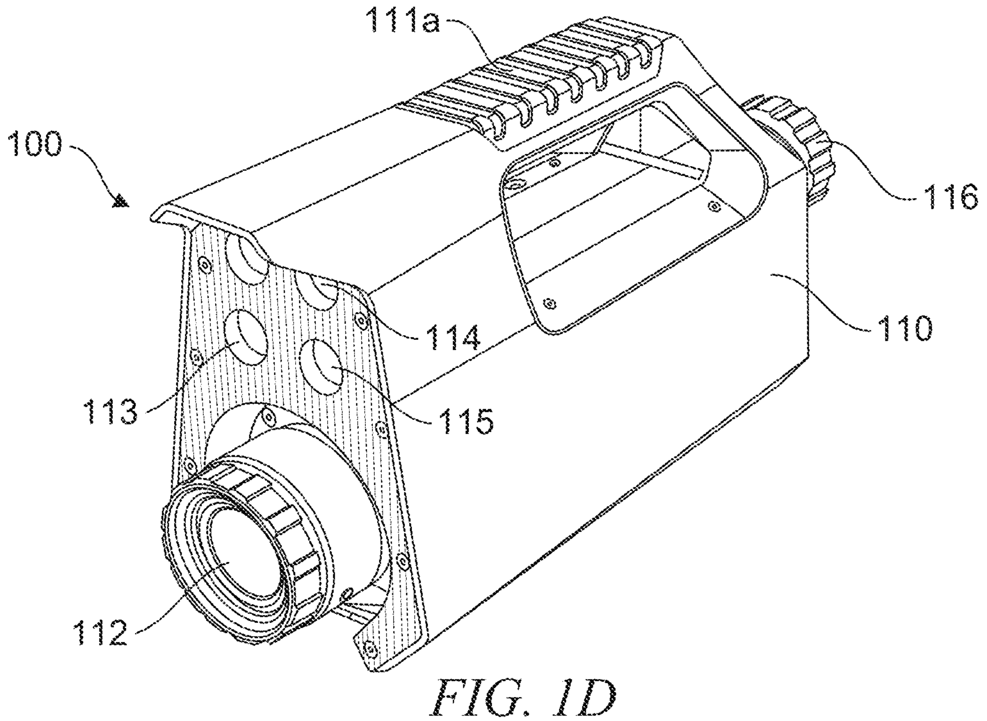
FIG. 1D is a perspective view of an opposite end and the opposite side of the OGI camera.
Figure 1E:
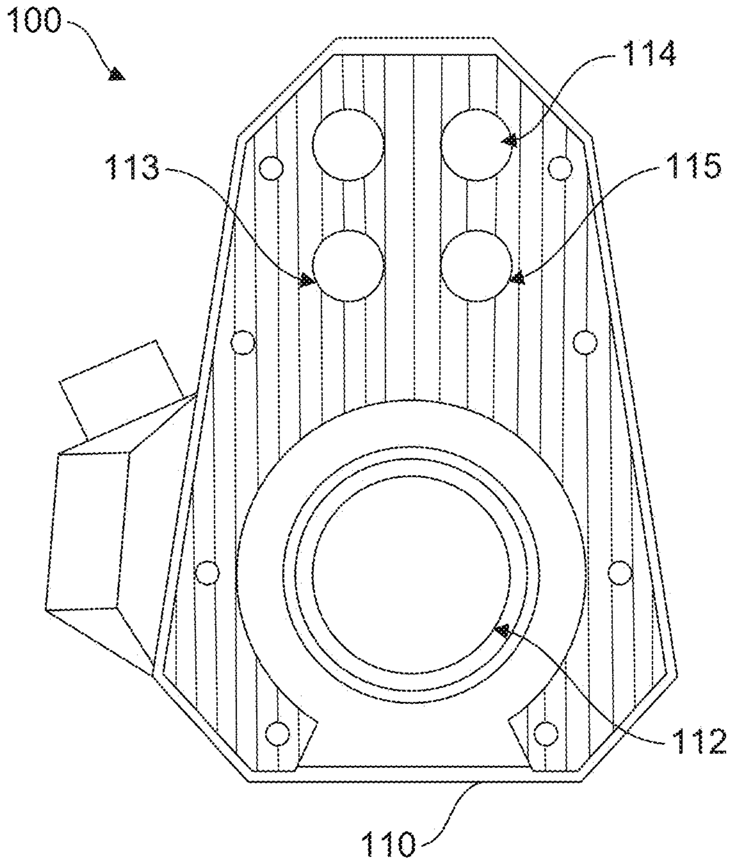
FIG. 1E is an elevational view of the opposite end of the OGI camera.

The term "fugitive emissions", in singular or plural form, as used herein includes the undesirable or unintentional emissions of gases or vapors from pressure-containing equipment or facilities. Fugitive emissions can be imaged in real-time by the optical gas imaging camera disclosed herein. Fugitive emissions within the scope of the current disclosure can include gases or vapors from volatile organic compounds (VOCs) and hazardous air pollutants (HAPs). In aspects, fugitive emissions can include any gas or vapor that is detectable by mid-wave infrared (MWIR) technology of the optical gas imaging camera disclosed herein.

The term "image" as used herein refers to a single image (e.g., a photo in any file format) or a series of images (e.g., a video in any file format).

The disclosed optical gas imaging (OGI) camera and compliance auditing system can capture, create, and store fugitive emission detection data in a manner that is repeatable and readily accessible so that the fugitive emission detection data captured at one point in time can be retrieved and audited at a later point in time when proof of compliance with reporting requirements is needed. Methods for teaching and operating the OGI camera are also disclosed, where the OGI camera learns a path in a facility (e.g., a plant), and the OGI camera can subsequently guide any user of the OGI camera to target objects in the facility, thereby instructing the user to make adjustments in the position of the OGI camera at a given target object so that image and data capture is in the same position for a target object every time the target object is observed with the OGI camera, independent of the specific user.

The disclosed OGI camera has the ability to 1) detect fugitive emissions (e.g., leaks) of various chemical species (e.g., organic compounds, volatile organic compounds (VOCs), and greenhouse gases); 2) quantify the amount of fugitive emissions of chemical species (e.g., by receiving and processing additional information, such as process data, on-site wind speed data, and weather data with the gas concentration data); 3) include repeatability of capturing the same information with the OGI camera for fugitive emission detection, 4) automate the processing of received data and captured images into a compliance-ready format that includes metadata associated with each image data (e.g., metadata associated with a video file that contains the minimum length of recording required by regulations, such as at least 5 seconds), and 5) store the compliance data and/or to send the compliance data to a central computer that stores the compliance data. The compliance data can then be readily retrieved from the OGI camera or the central computer at a later time and displayed on a display device for proof of compliance in an internal or external audit required by regulations, where the compliance data can be displayed such that values for data required to prove compliance with regulations are displayed or otherwise communicated with the image data to a device for compliance/audit observation.

An advantage of the disclosed OGI camera is that the camera combines all required components for compliance within the onboard computer, such that all data needed to generate a compliance data that is readily auditable at a future time is received into the OGI camera and that is packaged on-board by the same OGI camera into the compliance data. The OGI camera may then optionally store the compliance data and/or send the compliance data to a central computer that is networked with the OGI camera for storage. The compliance data may be reviewed by any number of authorized personnel for compliance and confirmation of accurate data without having to enter the facility gates or operational sites. This can reduce the number of personnel within the operational areas, which increases safety, and reduces the need for training and maintenance of credentials for those entering potentially hazardous areas.

Compliance data is generated for every observation of every target object. For example, in a plant with six target objects for fugitive emission detection, the OGI camera, in operating mode, generates compliance data for every target object and stores the compliance data and/or sends the compliance data to a central computer that is networked with the OGI camera for storage, for each of the target objects.

In aspects, "compliance data" includes captured image and associated metadata to understand any one input/recordation from the camera. In aspects, compliance data can further include data and information that is input via a central computer (e.g., see central computer 302 in system 1000 of FIG. 3, or central computer 402 in system 2000 of FIG. 4) and associated with the compliance data for fugitive emissions detection at a target object (and any data input for any fugitive emissions detection for any target object).

FIGS. 1A to 1E are various views of an embodiment of an OGI camera 100 disclosed herein. The OGI camera 100 illustrated in FIGS. 1A to 1E is a hand-held device; however, it is contemplated that the camera components and functionality described herein can be embodied as a wearable device, or a combination hand-held and wearable device. In the combination hand-held and wearable device, the wearable device can be embodied as a tablet, wrist device, or glasses that are communicable with the OGI camera 100 to display captured images in real-time. It is further contemplated that the OGI camera 100 can be part of an autonomous robot that is programmed to follow a path for fugitive emission detection of target objects in a facility.

The OGI camera 100 can include a housing 110 that holds a mid-wave infra-red (MWIR) camera 112, a visible light camera 113, a light detection and ranging (LIDAR) sensor 114, a temperature sensor 115, and a viewfinder 116. Additional components that may be contained within the housing 110 but would not be viewable from outside the housing 110 in FIGS. 1A to 1E are an inertial measurement unit (IMU), a wireless transceiver, and a geographic position device (e.g., the IMU 117, wireless transceiver 118, and geographic position device 119 illustrated in FIG. 2). Various buttons 120 can be placed on the housing 110 and operably connected to a system on module (e.g., SOM 201 in FIG. 2), for controlling the components (e.g., MWIR camera 112, the visible light camera 113, the viewfinder 116, or combinations thereof) of the OGI camera 100.

The housing 110 can be of any shape configured to hold all the components of the OGI camera 100 disclosed herein. The housing 110 can be formed of a metal or plastic material, for example. The housing 110 can be configured with a top handle 111*a* for carrying the OGI camera 100 by hand, e.g., when not in use for fugitive emission detection. The housing 110 can be configured with a side handle 111*b* with strap 111*c* for holding the OGI camera 100 by hand, e.g., when in use for fugitive emission detection. The housing 110 can be configured with a bottom connection port for attaching to a tripod for use when capturing data and fugitive emission detection operations. The buttons 120 can be located on the housing 110 on or near the side handle 111*b* so that the user of the OGI camera 100 can actuate the buttons 120 with the user's fingers while the user's hand is on the side handle 111*b*.

The MWIR camera 112 can be any MWIR camera configured to detect images of fugitive emissions via mid-wave infra-red gas detection technology. The MWIR camera 112 can include a lens assembly, an infrared sensor device, an optical bandpass filter, and an optional refrigeration system.

The lens assembly can include one or more lenses configured to optically focus the MWIR camera 112 on a target object. In aspects, at least a portion of the lens assembly extends outside of the housing 110.

The infrared sensor device can include a detector array that detects MWIR radiation with wavelengths between 3-5 microns. In some aspects, the detector array can include several individual detector elements arranged in a two-dimensional grid. Each detector element can measure the MWIR radiation emitted by the gas molecules within a field of view of the MWIR camera 112.

The optical bandpass filter is located along an optical path between the lens assembly and the infrared sensor device. The MWIR radiation received through the lens(es) of the lens assembly can be filtered by the optical bandpass filter. In aspects, the optical bandpass filter can have a pass band (bandpass transmittance range) in a range of from about 3100 nm to about 3600 nm.

The refrigeration system can optionally be included in the MWIR camera 112 to control the temperature of the infrared sensor device, e.g., at a temperature of about 150 K. In some aspects, the refrigeration system is configured to additionally cool the optical bandpass filter, e.g., to allow for a more focused image compared to no cooling of the optical bandpass filter. The refrigeration system can be embodied as a closed-loop Stirling cooler system, which uses helium as a refrigerant.

An example of a commercially available MWIR camera 112 is the Merlin™ mid-wavelength infrared (MWIR) high-performance camera available from Indigo Systems, Inc.

When focused on a target object, Infrared waves within the view of the MWIR camera 112 pass through the lens assembly, through the optical bandpass filter, and to the infrared sensor device. The infrared waves are filtered by the optical bandpass filter according to the pass band, and then the filtered infrared waves are then received by the infrared sensor device. The infrared sensor device converts the filtered infrared waves to an electrical signal representing the filtered infrared waves. This electrical signal is then processed by electronic components in the MWIR camera 112 to produce a captured IR image representing the filtered infrared waves.

The MWIR camera 112 is configured to output captured IR images to the digital encoder 203 of the OGI camera 100. In aspects, the pixelation of the captured IR images is at a lower resolution than a captured visible light image generated by the visible light camera 113 of the OGI camera 100.

The visible light camera 113 can be any visible light camera configured to detect visible light images of the area where the MWIR camera 112 captures images. In aspects, the MWIR camera 112 and the visible light camera 113 have the same or almost the same viewing range. In aspects, the visible light camera 113 can have an optical center that is the same as an optical center of the MWIR camera 112. The visible light camera 113 is configured to output captured visible light images to the digital encoder 203 of the OGI camera 100.

The LIDAR sensor 114 can be any device configured to use laser imaging, detection, and ranging (LIDAR) technology to determine a distance between a target object and the OGI camera 100. The LIDAR sensor 114 is configured to continuously, or on demand, output distance measurements signals containing distance data to the SOM 201 (e.g., via the sensor board 202). In aspects, the LIDAR sensor 114 can send distance data to the SOM 201 within the OGI camera 100 during image recording so that the distance data can be included with metadata that is associated with captured images and so the SOM 201 can send an alert signal to the viewfinder 116 (and/or to a light or audio speaker) of the OGI camera 100 if the distance is not within the calibrated distance that the OGI camera 100 was programmed to use for the particular target object.

For example, a law or regulation may require a daily initial distance test to set a maximum allowable distance of the OGI camera 100 from the target object to capture subsequent images of the target object with an allowed error percentage (e.g. 5%), and then every image capture of a target object during that day must be captured within the maximum distance set at the beginning of the day. Under this daily initial distance requirement, the daily initial distance (e.g., the maximum distance for the day) can be sensed by the LIDAR sensor 114, sent by the LIDAR sensor 114 to the SOM 201, and stored (e.g., temporarily) by the SOM 201 for additional operation of the OGI camera 112 at the target object that day. For each subsequent fugitive emission detection during that day, the distance between the OGI camera 100 and the target object can be sensed by the LIDAR sensor 114, sent by the LIDAR sensor 114 to the SOM 201, optionally stored (e.g., temporarily) by the SOM 201. The SOM 201 can include i) the daily initial distance and ii) each distance determined during a fugitive emission measurement associated with the target object, as part of the metadata associated with each subsequent image captured that day, such that the data can later be verified when a user or inspector retrieves a compliance data.

The temperature sensor 115 can be one or more non-contacting thermal measurement devices (e.g., a thermopile) configured to measure the background temperature at the OGI camera 100 within the maximum required error percentage. The temperature sensor 115 is configured to output a temperature signal containing temperature data to the SOM 201 of the OGI camera 100 (e.g., via the sensor board 202). The temperature sensor 115 sends the data to be recorded and applied to each respective capture so the data can be verified after capture. In aspects, the temperature sensor 115 can send temperature data in the temperature signal to the SOM 201 within the OGI camera 100 during image recording so that the temperature data can be included with metadata that is associated with the captured image.

The viewfinder 116 is real-time display of the image(s) detected by the MWIR camera 112, the visible light camera 113, or both the MWIR camera 112 and the visible light camera 113. In aspects, the viewfinder 116 can have a diopter sight correction+/−3. As can be seen in FIGS. 1A to 1E, at least a portion of the viewfinder 116 extends outside the housing 110. The viewfinder 116 is configured so that a user of the OGI camera 100 can place the viewfinder 116 up to the user's eye to view the real-time images while the user is holding the OGI camera 100 (e.g., via side handle 111*b*). The SOM 201 is configured to output the captured images in real-time to the viewfinder 116 and/or to a connected tablet (e.g., tablet 301 in FIG. 3) so that the user of the OGI camera 100 can position the OGI camera 100 correctly for recording of a target object. The respective position is viewed as additional data that can be recorded and applied to each respective capture so the data can be verified after capture.

Figure 2:
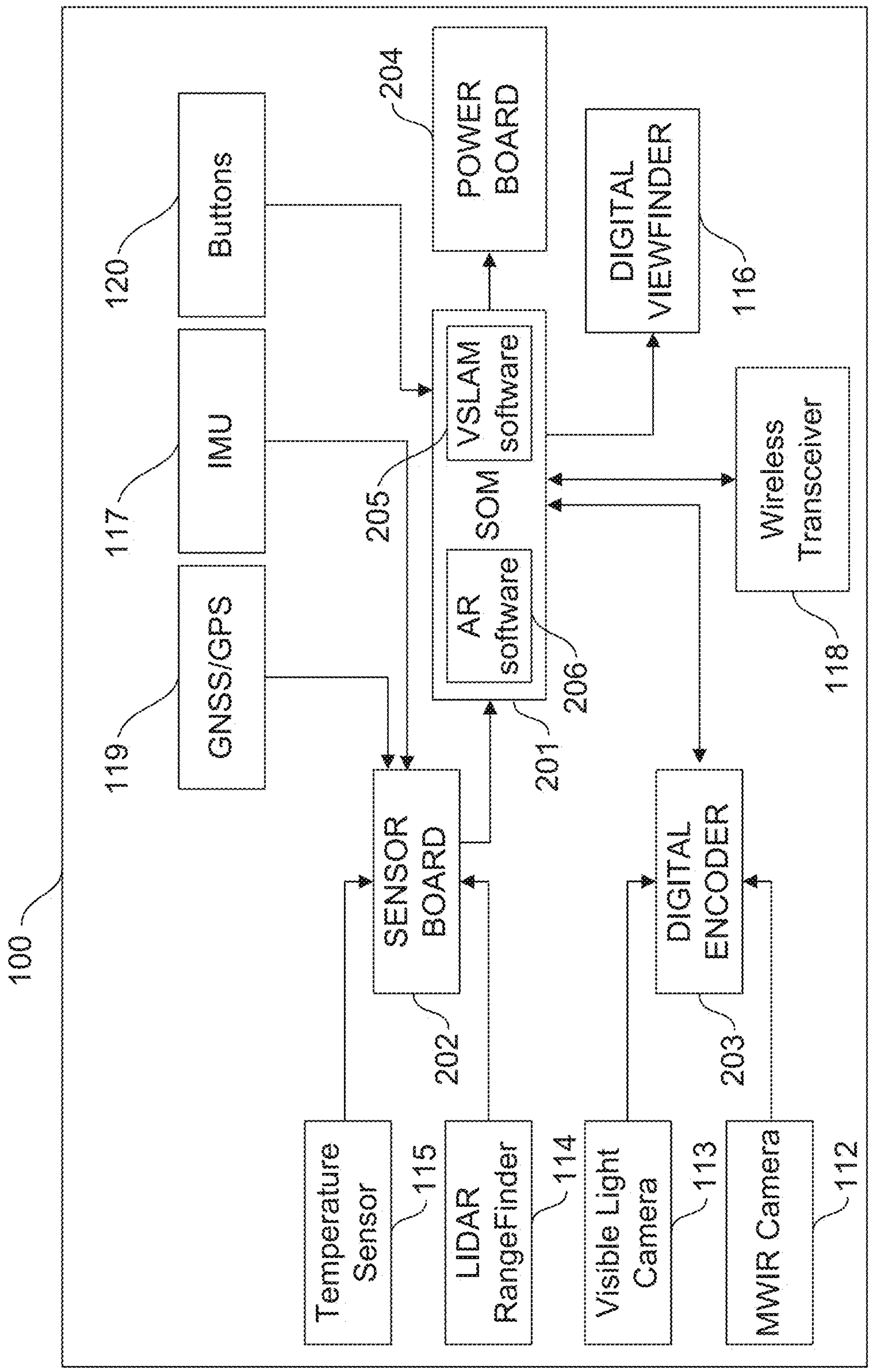
FIG. 2 is a schematic view of an embodiment of the electrical and computer architecture of the OGI camera.

FIG. 2 is a schematic view of an embodiment of the electrical and computer architecture of the OGI camera 100. Components of the OGI camera 100 that are illustrated in FIG. 2 but not in FIGS. 1A to 1E are intended to be contained within the housing 110 of the OGI camera 100. FIG. 2 illustrates the ability of the OGI camera 100 to have all the components onboard in a single device.

Discussed in FIGS. 1A to 1E, FIG. 2 illustrates that the OGI camera 100 can include a IMU 117, a wireless transceiver 118, and a geographic position device 119.

The IMU 117 is a device that is configured to determine the orientation of the OGI camera 100 by detecting linear acceleration using one or more accelerometers and rotational rate using one or more gyroscopes. The detected linear acceleration and rotational rate can be input to processor of the IMU 117 that calculates the altitude, velocity, angular position, or combinations thereof of the OGI camera 100. The IMU 117 is configured to output an orientation signal containing pose data to the SOM 201 (e.g., via the sensor board 202). The SOM 201 can use the orientation signal to direct a user of the OGI camera 100 to correctly point the OGI camera 100 to a target object, e.g., via execution of the vSLAM software as discussed herein. In aspects, the IMU 117 can send pose data to the SOM 201 within the OGI camera 100 during image recording so that the pose data can be included with metadata that is associated with the captured image.

The wireless transceiver 118 can be any transmitter and receiver configured to receive and send wireless data as described herein. The wireless transceiver 118 is configured to receive data via a wireless network connection (e.g., Bluetooth, Wi-Fi, NFC, or combinations thereof) from additional sensors (e.g., meteorological data at a facility), to receive compliance data containing images and metadata from the SOM 201, and to send the compliance data containing images and metadata to a central computer (e.g., central computer 302 in FIG. 3) via a wired or wireless network connection (e.g., WAN, LAN, WiFi) for storage in a datastore and archiving. In aspects, a peripheral device (e.g., tablet, cell phone, or other device) can be connected via a wired or wireless network connection (e.g., WAN, LAN, WiFi) to the wireless transceiver 118, and the wireless transceiver 118 can receive real-time images from the SOM 201 and send the real-time images to the peripheral device for viewing by a user (e.g., in addition to or in alternative to viewing the real-time images on the viewfinder 116). The wireless transceiver 118 can also include hardware for receiving signals such as radio frequency signals (e.g., LoRa signals) from the navigation base station disclosed herein. In such embodiments, the wireless transceiver may not have a wireless network connection with the navigation base station yet have capability to receive any signals transmitted from a navigation base station.

The geographic position device 119 can be configured to send/receive/use global positions system (GPS) or global navigation satellite system (GNSS) signals to determine a geographic location or position of the OGI camera 100. In aspects utilizing a GNSS as the geographic position device 119, the GNSS can accurately determine the geographic position the OGI camera 100 within about 3 feet (about 1 meter) of the actual position. When a GNSS is utilized as the geographic position device 119, accuracy of geographic position is increased versus utilizing GPS positioning. The geographic position device 119 is configured to output a geographic position signal containing geographic position data to the SOM 201 of the OGI camera 100 (e.g., via the sensor board 202). In aspects, the geographic position device 119 can send geographic position data to the SOM 201 within the OGI camera 100 during image recording so that the geographic position data can be included with metadata that is associated with the captured image. In aspects, the geographic position device 119 can include an antenna that is contained in the housing 110 of the OGI camera 100; alternatively, at least part of the antenna of the geographic position device 119 can extend outside the housing 110 of the OGI camera 100, e.g., in a helical GNSS antenna embodiment.

The OGI camera 100 can additionally include one or more of a sensor board 202, a digital encoder 203, and a power board 204.

The sensor board 202 can be connected to the LIDAR sensor 114, the temperature sensor 115, the IMU 117, the geographic position device 119, and to the SOM 201. The sensor board 202 is configured to receive signals from the LIDAR sensor 114, the temperature sensor 115, the IMU 117, and the geographic position device 119, and to send signals representing values corresponding to each component 114, 115, 117, and 119 to the SOM 201. In aspects, the sensor board 202 receives and sends sensor signals and data continuously to the SOM 201.

The digital encoder 203 is connected to the MWIR camera 112, to the visible light camera 113, and to the SOM 201. The digital encoder 203 is configured as a two-channel encoder, to receive a captured IR image from the MWIR camera 112 and to receive captured visible light image from the visible light camera 113. The digital encoder 203 is further configured to receive metadata from the SOM 201.

The digital encoder 203 is further configured to encode the received images and metadata into an encoded data file/stream/packet, and to send the encoded data file/stream/packet to the SOM 201, by for example, compressing and attaching the relevant metadata to the images, and sending the encoded data/stream/packet (e.g., encoded data, encoded data stream, encoded data packet) to the SOM 201. In aspects, the encoded data can be sent to the SOM 201 in form of an encoded data stream that is continuously streamed from the digital encoder 203 to the SOM 201; alternatively, the encoded data can be sent to the SOM 201 in form of an encoded data packet that is periodically sent from the digital encoder 203 to the SOM 201. Encoding can include combining the image data received from the MWIR camera 112 and the visible light camera 113 to generate the combined image, and attaching the metadata to the combined image. In aspects, the format of the encoded data/stream/packet can be key-length-value (KLV) format.

In aspects, the digital encoder 203 of the OGI camera 100 can be configured to adjust, combine, overlay, or combinations thereof, the captured IR image generated by the MWIR camera 112 with the captured visible light image generated by the visible light camera 113 to generate a combined image. Adjusting, combining, overlaying, or combinations thereof the captured IR image and the captured visible light image to generate a combined image can increase the human-eye visibility of any fugitive emission in the combined image. In aspects, the combined image can have an effectively higher resolution than either image alone.

The SOM 201 is connected to sensor board 202, the digital encoder 203, the power board 204, the viewfinder 116, the wireless transceiver 118, and the buttons 120.

The SOM 201 can be embodied as a single-board circuit having one or more processor cores, memory, and software stored on the memory and executed by the one or more processor cores, to perform the functions of the SOM 201 described herein. The SOM 201 can additionally include visual simultaneous localization and mapping (vSLAM) software 205 and augmented reality (AR) software 206 stored and executed thereon, that is configured to perform functions described herein.

The vSLAM software 205 is configured to simultaneously i) determine localization of the OGI camera 100 and ii) to compare the visible light image to reference images (e.g., of target objects within a plant or refinery) to create an accurate positioning for the user of the OGI camera 100. Determining the localization of the OGI camera 100 can include calculating a pose (e.g., orientation with respect to horizontal), position (e.g., latitude and longitude), distance to target object, altitude of the OGI camera 100, or combinations thereof based on an orientation of the OGI camera 100, relative to the target object. The vSLAM software also analyzes images external to the OGI camera 100 from visible light image data that is received by the SOM 201 to guide and navigate operators of the OGI camera 100 to accurately the OGI camera 100 relative to a target object. The vSLAM software 205 aligns the target object with a reference visible light image for a target object that was captured during learning mode. The reference visible light image is retrieved from memory on the SOM 201 and processed by the vSLAM software 205. In aspects, the vSLAM software 205 can determine an adjustment in position and orientation for a user of the OGI camera 100 at an observation point for a particular target object or multiple target objects at the observation point.

The SOM 201 can process the adjustment, and the augmented reality software 206 can use the adjustment to output a visual indicator (e.g., an arrow in an augmented reality layer on the captured image) to the viewfinder 116 containing adjustment information so that the user of the OGI camera 100 can adjust the position and/or orientation of the OGI camera 100 to the same position and orientation that is the learned position and orientation for a target object. The ability of the OGI camera 100 to output an adjustment to the user makes image capture as consistent as possible for a target object over many observations by different users, since the OGI camera 100 can direct the user to adjust the position and orientation at the moment of image capture for the user's unique physical characteristics (e.g., gait, height).

The augmented reality (AR) software 206 is configured to generate an augmented reality layer on top of a real-time image, and to generate one or more augmented reality objects for display in the augmented reality layer. The SOM 201 is configured to display the augmented reality layer on the real-world image (e.g., captured IR image, capture visible light image, combined image) that is displayed on the viewfinder 116. For example, augmented reality layer can include a plurality of augmented-reality objects (e.g., an arrow giving direction of target object, a symbol for the location of the target object within the view of the OGI camera 100, or both) visually layered on top of the real-world image, within the field of view of the OGI camera 100.

Figure 5:
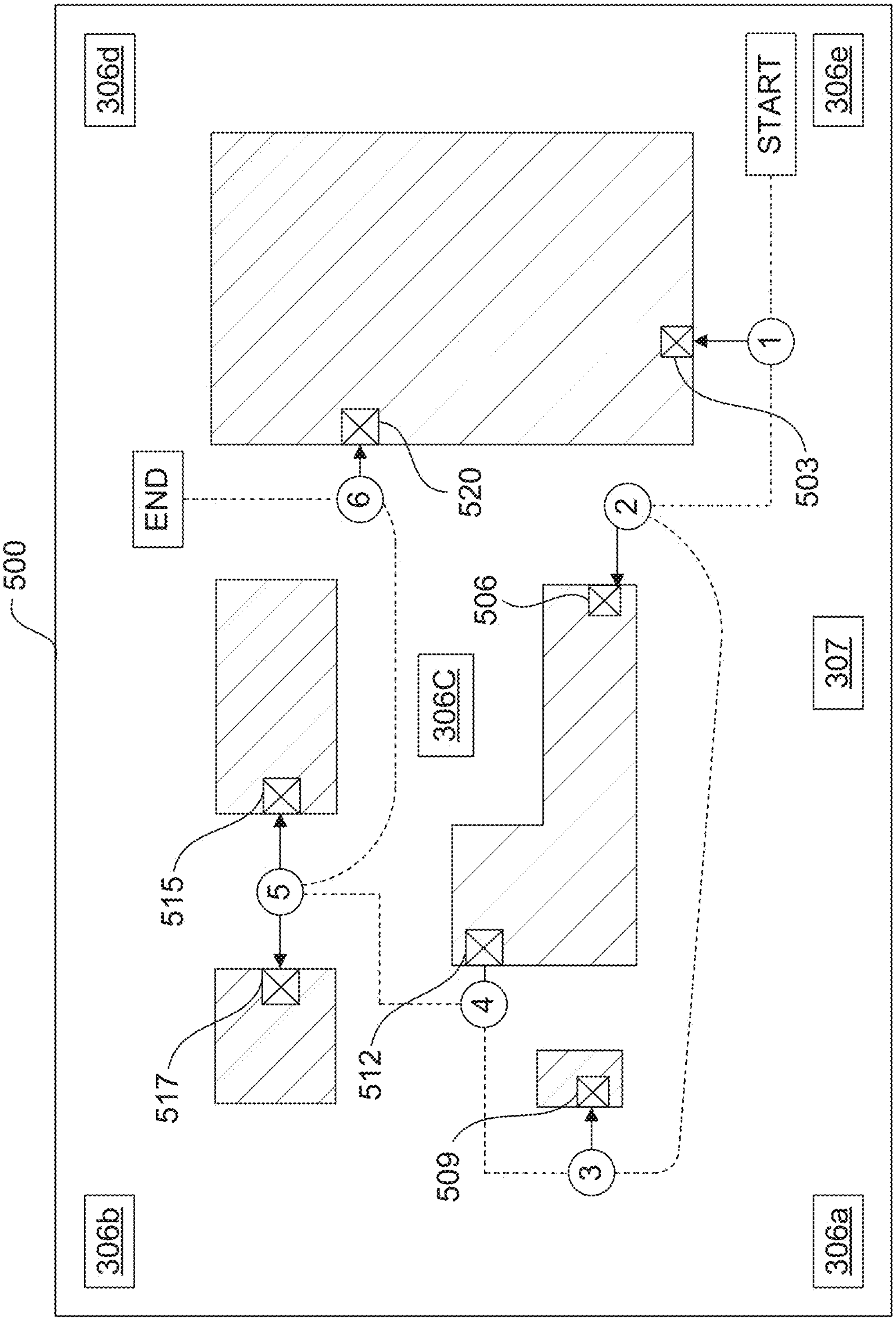
FIG. 5 is a map of a plant, with a fugitive emission detection path taken by an operator of the OGI camera.

In aspects, the SOM 201 can determine when and where to display augmented reality objects in the augmented reality layer based on one or more of positional data, distance data, and pose data sensed at an observation point for a target object (e.g., see FIG. 5 for observation points 1, 2, 3, 4, 5, and 6 for target objects 503, 506, 509, 512, 515, 517, and 520). In aspects, the positional data, the pose data, the distance data, or combinations thereof for each target object are measured during the learning mode of the OGI camera 100, which is described in more detail below. In the operating mode of the OGI camera 100, the user can be directed towards an observation point to again capture positional data, pose data, distance data, or combinations thereof. In operating mode, the captured positional data, captured pose data, captured distance data, or combinations thereof can be i) compared with reference positional data captured in learning mode, with reference pose data captured in learning mode, with reference distance data captured in learning mode to verify the OGI camera 100 is in the correct location for fugitive emission detection, and/or ii) incorporated into metadata associated with captured images for the compliance data. The OGI camera 100 can be configured such that each time an operator passes a particular observation point, one or more augmented reality objects can be displayed on an augmented reality layer on the real-time image (real-time image of the real world view) that is displayed on the viewfinder 116 or a smart device networked with the OGI camera 100 (e.g., the captured IR image, the captured visible light image, or the combined image that is displayed on the viewfinder 116 or smart device at that time), so an operator can correctly capture images of the desired target objects. Multiple target objects may be portrayed in the viewfinder 116 at any given time.

The SOM 201 is configured to receive different ambient measurements that may not be housed within the camera itself, but aid or assist in fugitive emission detection and reporting. One such ambient measurement that may be integrated with the SOM 201 is an anemometer reading, which allows for quantification of the actual fugitive emission quantification. Further variables may include examples such as ambient wind speeds, relative humidity, barometric pressure, ambient temperature, and other meteorological data.

In aspects, the SOM 201 can be configured to compare a reference image (e.g., a reference IR image, a reference combined image) of a target object with the captured IR image, the combined image, or both, to determine a threshold condition is exceeded (e.g., a. number of pixels indicating a fugitive emission is greater than a threshold pixel value), and to generate an alarm attribute that can be placed in the metadata associated with the captured IR image and/or the combined image.

Referring back to when the SOM 201 receives an encoded data/stream/packet from the encoder 203, e.g., in a KLV data stream for a target object, the SOM 201 is also configured to combine the received encoded data/stream/packet comprising the metadata) into compliance data (e.g., a 30 FPS video stream). The compliance data can be stored on memory of the SOM 201, transmitted to a central computer (e.g., central computer 302 or 402 in systems 1000 or 2000, or both. The SOM 201 is configured to assemble a compliance data comprising image data and metadata that corresponds to the image data.

In aspects, metadata can include:

1) operator identification,
2) camera identification,
3) date,
4) time,
5) site name and/or assigned name,
6) target object identifier,
7) distance between the target object and the OGI camera 100,
8) whether the distance between the target object and the OGI camera 100 is greater than a maximum allowed distance,
9) ambient and/or background temperature value(s), 10) a value difference in temperature between the ambient temperature value and the temperature measured by the temperature sensor 115, 11) whether the value difference in temperature is less than 0.5° C. (e.g., yes or no), 12) 24-hour compliance calibration data, 13) the date and time of a most recent calibration of the OGI camera 100, 14) whether the most recent calibration was pass or fail, 15) whether the most recent calibration meets performance verification requirement, 16) proof of verification check for the date that the image data was generated, 17) the operating mode of the OGI camera 100 (e.g., learning mode, operating mode, standard mode, sensitive mode, handheld mode, tripod mode, or combinations thereof), 18) whether image capture utilized the viewfinder 116, a display of a separate smart device (e.g., tablet, wrist device, smart glasses), or a combination thereof, 19) tags for target objects, 20) route tracing data, 21) duration of image data is at least 5 seconds (e.g., yes or no), 22) positional data (e.g., longitude and latitude), 23) pose data (e.g., angle of view relative to horizontal), 24) wind speed data, 25) weather conditions data, 26) or combinations thereof.

Figure 3:
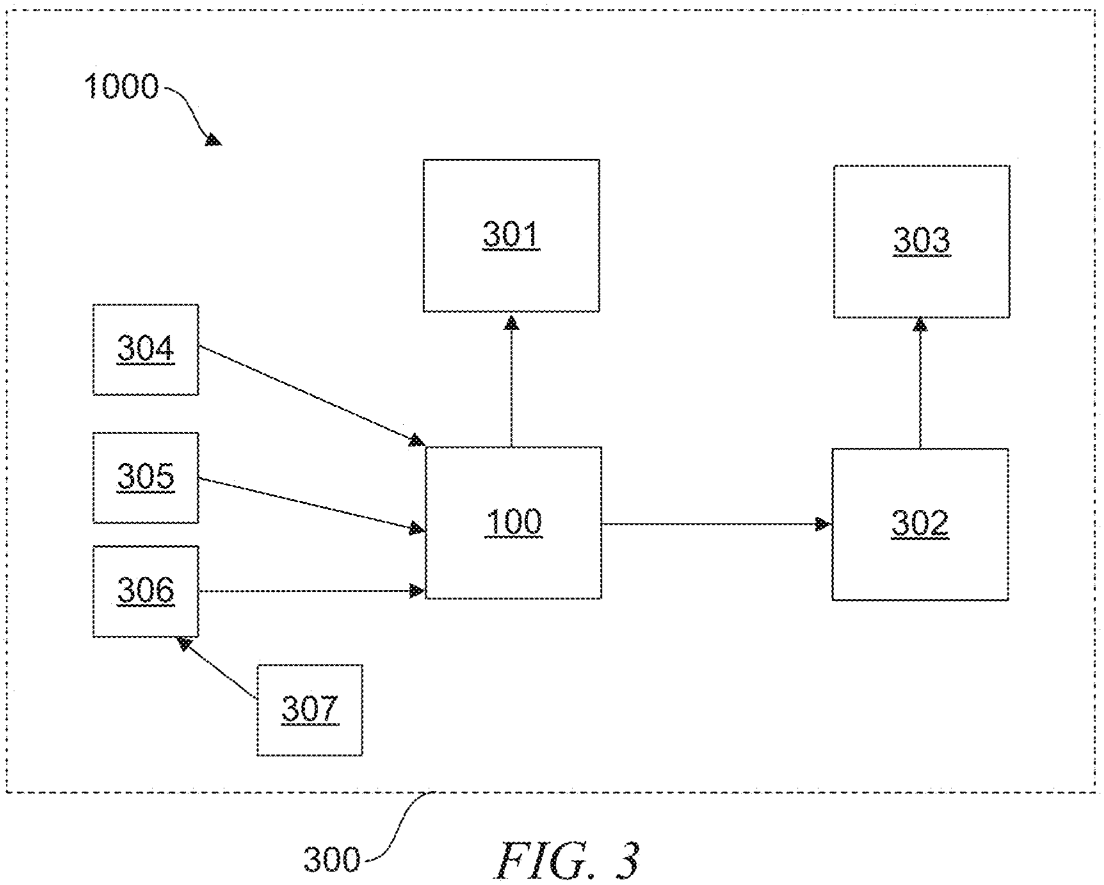
FIG. 3 is a diagrammatic view of a compliance auditing system utilizing the disclosed OGI camera.

FIG. 3 is a diagrammatic view of a compliance auditing system 1000. The system 1000 is illustrated as being located on-site of a plant 300. The system 1000 can include one or more of the OGI camera 100, an optional smart device 301, a central computer 302, an optional smart device 303, a wind anemometer 304, a weather station 305, a navigation base station 306, and an optional geographic position error correction device 307.

The OGI camera 100 can be embodied as the OGI camera 100 described for FIGS. 1A to 1E and 2, and such description is not reproduced here.

The smart device 301 is optional in the system 1000. In aspects where the smart device 301 is present, the smart device 301 can be embodied as a smart phone, tablet, laptop, PC, or other computer device. The smart device 301 can have a display and wireless transceiver configured to communicate with the wireless transceiver 118 of the OGI camera 100 for real-time display of the captured visible light images, captured IR images, captured combined images, or combinations thereof, that are captured by the OGI camera 100. The smart device 301 can additionally be used to assist in the control of the OGI camera 100 while a user is holding the OGI camera 100. Commands and prompts may be sent from the smart device 301 to assist the OGI camera 100 user in various tasks including such things as training, emissions detection, and proper metadata collection.

The smart device 301 is networked with the OGI camera 100. The smart device 301 and the OGI camera 100 can be networked via a wireless internet connection or any local area network including wired and wireless connections, or combinations thereof. The networks used for communication between the smart device 301 and the OGI camera 100 can include a Global System for Mobile Communications (GSM), Code-division multiple access (CDMA), General Packet Radio Service (GPRS), Evolution-Data Optimized (EV-DO), Enhanced Data Rates for GSM Evolution (EDGE), Universal Mobile Telecommunications System (UMTS), etc.

The central computer 302 can include one or more processors, memory, networking cards or interfaces, and other equipment or be a cloud-based virtualized system for performing the functionality disclosed herein. The central computer 302 is configured to receive compliance data from the OGI camera 100, and to store the compliance data after receiving. In embodiments of the system 1000 having the smart device 303, the central computer 302 can be configured to send compliance data to the smart device 303 for viewing on the smart device 303, e.g., by an internal auditor or an external auditor (e.g., an inspector of a government agency). In aspects, compliance data can further include data and information that is input via the central computer 302 by a user of the central computer 302 and associated with the compliance data for fugitive emissions detection at a target object (and any data input for any fugitive emissions detection for any target object).

In embodiments, the central computer 302 can include multiple computers, located in a brick-and-mortar location, local to the plant 300, in the cloud, or a combination thereof. In embodiments, the central computer 302 can include a distributed computer architecture, such that hardware is geographically distributed to one or more computers at multiple physical locations. For example, an operator having multiple plants can be a collection of computers that function as the central computer 302, where portions of the central computer 302 are located in each of the plants, some of the plants, or none of the plants. In some aspects, the central computer 302 can include computers embodied as servers that are scalable in the cloud, such as those available from any generally known online service providers.

The smart device 303 can be embodied as a smart phone, tablet, laptop, PC, or other computer device. The smart device 303 can have a display and wired or wireless transceiver configured to communicate with the central computer 302 (e.g., receive compliance data from the central computer 302).

The smart device 303 is networked with the central computer 302. The smart device 303 and the central computer 302 can be networked via any wired internet connection, wireless internet connection, local area network (LAN), wired intranet connection, wireless intranet connection, or combinations thereof. The networks used for communication between the smart device 303 and the central computer 302 can include a Global System for Mobile Communications (GSM), Code-division multiple access (CDMA), General Packet Radio Service (GPRS), Evolution-Data Optimized (EV-DO), Enhanced Data Rates for GSM Evolution (EDGE), Universal Mobile Telecommunications System (UMTS), etc.

The wind anemometer 304 can be any device configured to measure wind speed at the location of the plant 300. The wind anemometer 304 includes a wireless transmitter to send wind speed data to the wireless transceiver 118 of the OGI camera 100. The wind anemometer 304 can send wind speed data at a configurable frequency. The frequency of wind speed data transmission can be more frequent than the minimum time under regulation for recording the captured images for the OGI camera 100 so that a wind speed value can be included in metadata of a captured image.

The weather station 305 can be any device configured to measure weather conditions at the location of the plant 300. The weather conditions can include temperature, barometric pressure, humidity, or combinations thereof. These conditions are referred to as the ambient conditions at the plant 300, e.g., ambient pressure, ambient temperature, ambient humidity, and refer to the general conditions at the plant 300.

The weather station 305 includes a wireless transmitter to send weather condition data to the wireless transceiver 118 of the OGI camera 100. The weather station 305 can send weather data at a configurable frequency. The frequency of weather data transmission can be more frequent than the minimum time under regulation for recording the captured images for the OGI camera 100 so that weather data can be included in metadata of a captured image.

Figure 6:
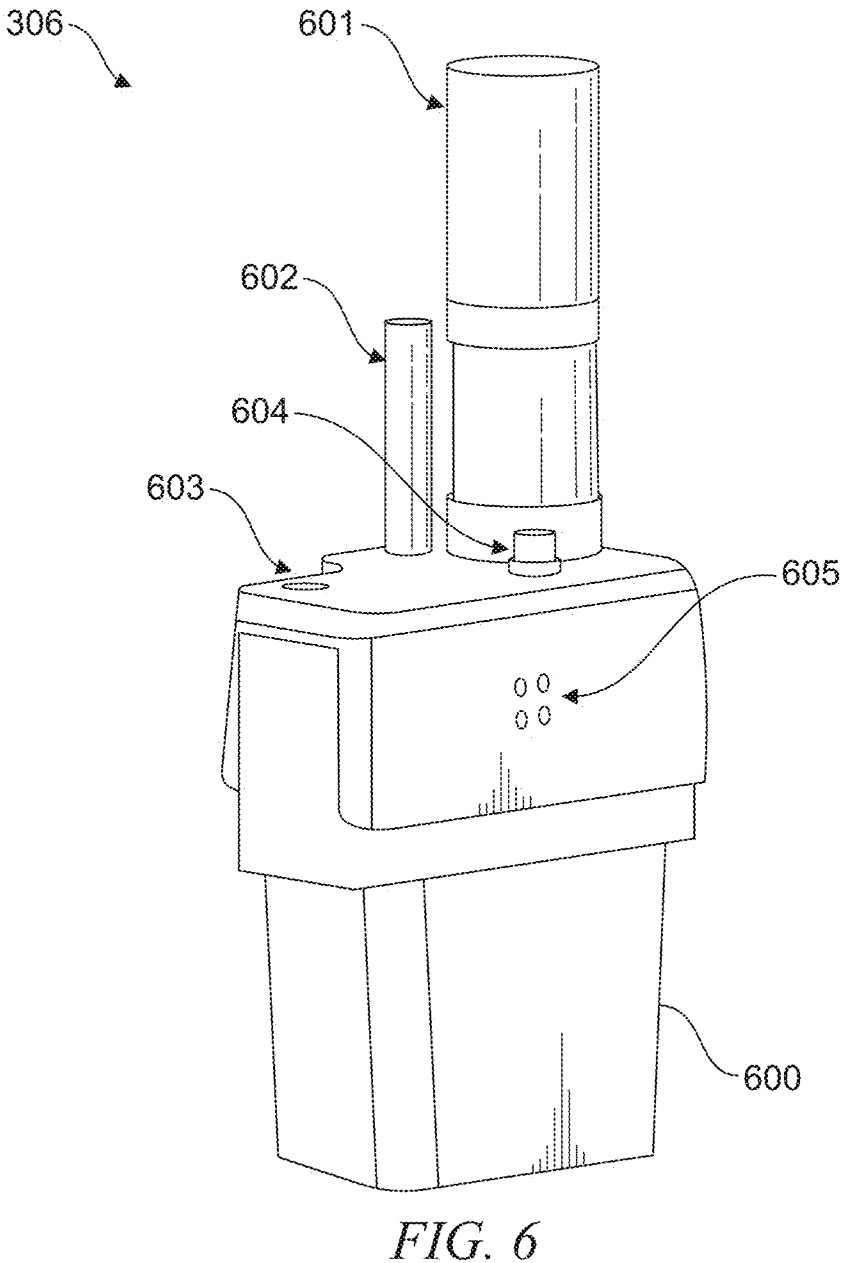
FIG. 6 is a side elevational view of an embodiment of a navigation base station.
Figure 7:
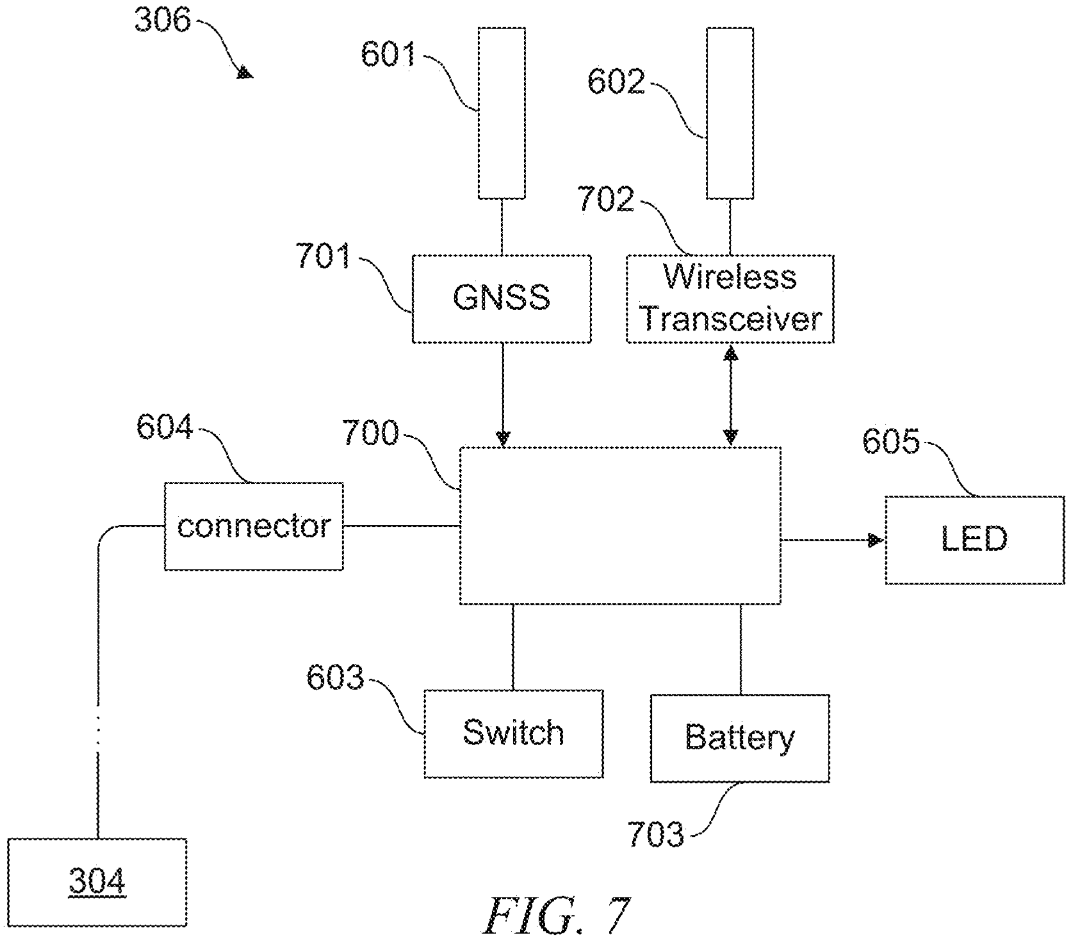
FIG. 7 is a schematic view of an embodiment of the electrical and computer architecture of the navigation base station.

The navigation base station 306 can be any device configured to determine geographic position error correction data and send the geographic position error correction data to the transceiver 118 of the OGI camera 100. FIG. 6 illustrates an embodiment of a navigation base station 306, and FIG. 7 is a schematic view of an embodiment of the electrical and computer architecture of the navigation base station 306. The navigation base station 306 can have a housing 600 that encloses a GNSS receiver 701 (e.g., a GNSS-RTK receiver), a wireless transceiver 702, a battery 703 (e.g., any voltage battery, such as a 12V to 24V DC battery pack), and a board 700 (e.g., SOM, printed circuit board, or system on chip) electrically connected to the GNSS receiver 701, the wireless transceiver 702, and the battery 703. The housing 600 can also hold a GNSS antenna 601 (e.g., a GNSS L1/L2 surveying band antenna), a wireless antenna 602, an on/off switch 603, an anemometer connector 604, and one or more light emitting diode (LED) 605 (a first LED that is illuminated by the board 700 to indicate a remaining battery life such as 20% or 10%, and a second LED to indicate transmission of a signal via the wireless transceiver 702), each of which is electrically connected to the board 700. The board 700 can generally include one or more processors and one or more memory configured for receiving and transmitting signals as described herein and operating the switch 603 and LED 605. In aspects, the connector 604 is configured to connect (e.g., via a wired connection such as a RS-485 cable) to the anemometer 304 such that the board 700 receives a signal for wind speed (correlated with wind speeds up to 45 m/s) from the anemometer 304, process the signal to generate a data value for wind speed at a point in time (e.g., associated with time stamp), and can include the wind speed data value in a signal sent to the OGI camera 100 via the wireless transceiver 702.

In aspects, the navigation base station 306 is configured to operate in a survey-in mode and in an error correction mode.

In the survey-in mode, the navigation base station 306 is configured to determine a geographic position of the navigation base station 306 via a GNSS receiver of the navigation base station 306. The navigation base station 306 can switch from the survey-in mode to the error correction mode after the navigation base station 306 determines its geographic position.

In some aspects, the navigation base station 306 can be configured with a position accuracy threshold (also referred to as accuracy setting) of equal to or less than 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 m.

In some aspects where the navigation base station 306 is operated in survey-in mode with a position accuracy threshold or tolerance of 0.1 m or less, determining the geographic position of the navigation base station 306 (the survey-in time) can take many hours. One solution to reduce the survey-in time of the navigation base station 306 is to mount the navigation base station 306 to the same mount (geographic location) in the plant 300 every time the navigation base station 306 is used. It has been found that using the navigation base station 306 in the same geographic location as a previous use can reduce the survey-in time to less than about 30 seconds. Another solution to reduce the survey-in time of the navigation base station 306 is to communicatively couple the geographic position error correction device 307 to the navigation base station 306 while the navigation base station 306 is in the survey-in mode. The wireless transceiver 702 of the navigation base station 306 can receive position error correction data from a wireless signal transmitter of the geographic position error correction device 307. The navigation base station 306 can also receive a GNSS signal (indicating a geographic position of the navigation base station 306 within about 1 meter of error) via the GNSS receiver 701 of the navigation base station 306 and determine a geographic position (within a few centimeters of error, also referred to as accuracy within a few centimeters) of the navigation base station 306 based on the GNSS signal received by the GNSS receiver 701 of the navigation base station 306 and the position error correction data received from the geographic position error correction device 307. It has been found that using the geographic position error correction device in combination with the navigation base station 306 can reduce the survey-in time to less about 2 minutes within a few centimeters of error. In some aspects, the geographic position of the navigation base station 306 is determined within a few centimeters of error additionally or alternatively based on the accuracy setting of the navigation base station 306 and the time strength of the GNSS signal received by the GNSS receiver 701. The navigation base station 306 can determine the geographic position of the navigation base station 306 and then switch from the survey-in mode to the error correction mode.

In the error correction mode, the navigation base station 306 is configured to determine any error in position signals subsequently received by the GNSS receiver 701, calculate a position error correction data, and send the position error correction data to the OGI camera 100, which receives the position error correction data via the transceiver 118 of the OGI camera 100. In aspects, the navigation base station 306 can send the position error correction data to the OGI camera 100 via a LoRa signal. In aspects, the navigation base station 306 can send the position error correction data to the OGI camera 100 while the OGI camera 100 is in the learning mode. Additionally or alternatively, the navigation base station 306 can send the position error correction data to the OGI camera 100 while the OGI camera 100 is in the operating mode.

The geographic position error correction device 307 can be any device configured to send position error correction data to the navigation base station 306 while the navigation base station 306 is in a survey-in mode. In some aspects, the geographic error correction device 307 can be embodied as a mobile phone such as a smartphone. in aspects, the geographic error correction device 307 can be communicably coupled via a communication network (e.g., Wi-Fi Internet connection, L Band satellite connection, or mobile data network) to a computer (e.g., a NTRIP caster computer/server computer) configured to send or broadcast position error correction data to the geographic position error correction device 307. A transmitter or transceiver of the geographic position error correction device 307 can transmit a data package comprising position error correction data via a signal (e.g., LoRa signal) sent to the transceiver 702 of the navigation base station 306. The navigation base station 306 then processes the data as described herein.

In aspects, more than one navigation base station 306 can be included in the plant 300 to communicate with the OGI camera 100. In aspects, a first base station of a plurality of navigation base stations 306 can connect or send signal to the OGI camera 100. The navigation base stations can communicate with one another via a base station network to determine the first base station is communicating with the OGI camera 100. The other navigation base stations then can receive the first base station's error correction data and transmit the same data as the respective navigation base station's signal. Multiple navigation base stations can be used for plants that are large in footprint, so that the OGI camera 100 can receive a strong signal from one of the multiple navigation base stations no matter the location of the OGI camera 100 in the plant 300.

In aspects, a signal extender or repeater can be placed in the plant 300 at any location between a navigation base station 306 and the OGI camera 100 and can be configured to receive the signal from the navigation base station 306 and repeat the signal to the OGI camera 100. The signal extender or repeater can be useful when the navigation base station 306 is far in distance from the OGI camera 100 such that the signal transmitted by the navigation base station 306 is too weak to be received by the OGI camera 100.

When one or more navigation base stations 306 are utilized, the OGI camera 100 can receive the geographic position error correction data, and the SOM 201 of the OGI camera 100 can apply the geographic position error correction data to the GNSS signal received by the GNSS/GPS receiver 119 of the OGI camera 100 to determine the geographic position of the OGI camera 100. When utilizing the geographic position error correction data, the geographic position determined by the OGI camera 100 can be within several centimeters of the actual geographic position of the OGI camera 100 (e.g., within 2.5 cm of error, or 2.5 cm or less accuracy).

In aspects, the geographic position error correction data comprises RTCM satellite correction messages or is derived from a GNSS-RTK signal.

In aspects, the navigation base station 306 is operated in survey-in mode before switching to error correction mode, and the OGI camera 100 can then be operating in learning mode and/or operating mode when the navigation base station 306 is in error correction mode.

Figure 4:
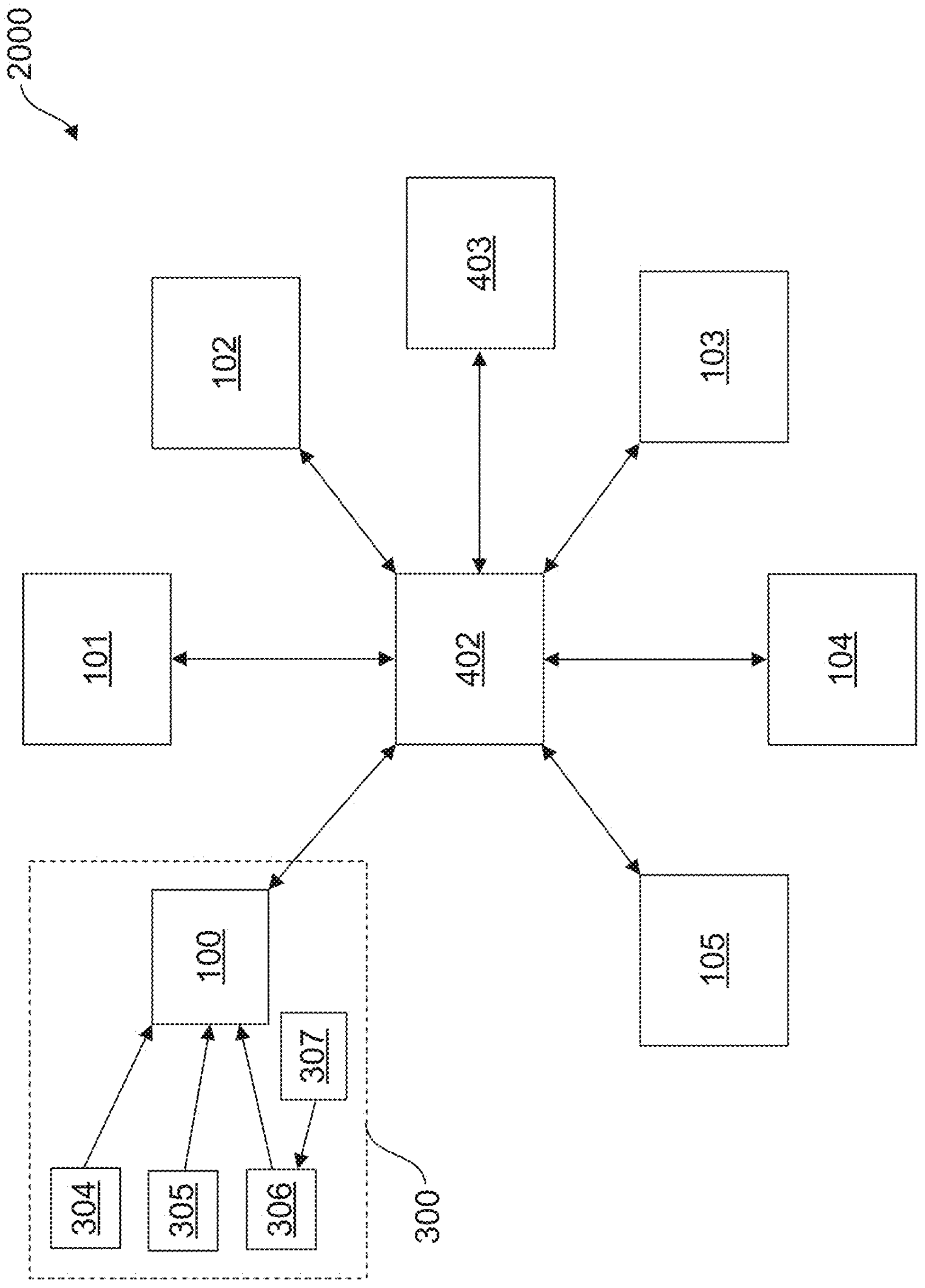
FIG. 4 is diagrammatic view of another compliance auditing system utilizing the disclosed OGI camera.

FIG. 4 is diagrammatic view of another compliance auditing system 2000. The system 2000 can include OGI camera 100 and multiple other devices 101, 102, 103, 104, and 105, a central computer 402, an optional smart device 403, a wind anemometer 304, a weather station 305, a navigation base station 306, and an optional geographic position error correction device 307. In some aspects, any combination of the multiple other devices 101, 102, 103, 104, and 105 can be OGI cameras configured in an embodiment described for OGI camera 100. In alternative aspects, any one or combination of the multiple other devices 101, 102, 103, 104, and 105 can be other peripheral devices (e.g., laptop, tablet, smartphone) configured with programming to connect to the OGI camera 100 via the central computer 402, for example, to aid in the setup of the OGI camera 100 with an operator. In aspects, any one or combination of the other devices 101, 102, 103, 104, and 105 can include other emissions measurement devices, such as an aerial surveillance device configured to detect and transmit fugitive emission data from an aerial vehicle (e.g., helicopter) to the central computer 402 or a methane sensor configured to detect and transmit fugitive emission data to the central computer 402.

The OGI camera 100, wind anemometer 304, weather station 305, navigation base station 306, and optional geographic position error correction device 307 of the system 2000 are illustrated as being located on-site of a plant 300. In aspects, it is contemplated that the wind anemometer 304 and weather station 305 can be mounted on a work truck of an operator of the OGI camera 100 that is on-site of the plant 300 with the operator. Alternatively, one or both of the wind anemometer 304 and weather station 305 can be mounted to equipment on-site of the plant. In aspects, it is contemplated that the navigation base station 306 can be mounted on a work truck of an operator of the OGI camera 100 that is on-site of the plant 300 with the operator; alternatively, the navigation base station 306 is mounted to a fixed structure, such as a pole, tower, or equipment existing in the plant 300. In aspects where the navigation base station 306 is mounted on a vehicle, the vehicle can be immobile during operation of the navigation base station 306. Keeping the vehicle immobile can ensure the accuracy of the error correction data that is determined by and sent by the navigation base station 306. The system 2000 is an example of having other OGI cameras 101, 102, 103, 104, and 105 networked with a central computer 400, where the other OGI cameras 101, 102, 103, 104, and 105 are in other locations that are not at the plant 300 where the OGI camera 100 is located.

In some embodiments, each OGI camera 100, 101, 102, 103, 104, and 105 can be configured as described for OGI camera 100 in FIGS. 1A to 1E and 2. Moreover, each OGI camera 100, 101, 102, 103, 104, and 105 can optionally be networked with a respective smart device, forming a camera/device pair for each OGI camera 100, 101, 102, 103, 104, and 105. Each of the smart devices can be configured the same as described for smart device 301 in the system 1000 of FIG. 3.

The central computer 402 can include one or more processors, memory, networking cards or interfaces, and other equipment for performing the functionality disclosed herein. The central computer 402 is configured to receive compliance data from the OGI cameras 100, 101, 102, 103, 104, and 105 and to store the compliance data after receiving. In embodiments of the system 2000 having the smart device 403, the central computer 402 can be configured to send compliance data to the smart device 403 for viewing on the smart device 403, e.g., by an internal auditor or an external auditor (e.g., an inspector of a government agency). In aspects, compliance data can further include data and information that is input via the central computer 402 by a user of the central computer 402 and associated with the compliance data for fugitive emissions detection at a target object (and any data input for any fugitive emissions detection for any target object).

The smart device 403 can be embodied as a smart phone, tablet, laptop, PC, or other computer device. The smart device 403 can have a display and wired or wireless transceiver configured to communicate with the central computer 402 (e.g., receive compliance data from the central computer 402). In aspects, the smart device 403 can be configured to allow or aid in setup of the OGI camera 100 with the operator of the OGI camera 100.

The smart device 303 is networked with the central computer 402. The smart device 403 and the central computer 402 can be networked via any wired internet connection, wireless internet connection, local area network (LAN), wired intranet connection, wireless intranet connection, or combinations thereof. The networks used for communication between the smart device 403 and the central computer 402 can include a Global System for Mobile Communications (GSM), Code-division multiple access (CDMA), General Packet Radio Service (GPRS), Evolution-Data Optimized (EV-DO), Enhanced Data Rates for GSM Evolution (EDGE), Universal Mobile Telecommunications System (UMTS), etc.

The wind anemometer 304 can be any device configured to measure wind speed at the location of the plant 300 and configured the same as described for the wind anemometer 304 in system 1000 in FIG. 3. Each plant in which any of the other OGI cameras 101, 102, 103, 104, and 105 is located can similarly include a wind anemometer configured the same as described for the wind anemometer 304 in system 1000 in FIG. 3.

The weather station 305 can be any device configured to measure weather conditions at the location of the plant 300 and configured the same as described for the weather station 305 in system 1000 in FIG. 3. Each plant in which any of the other devices 101, 102, 103, 104, and 105 is located can similarly include a weather station configured the same as described for the weather station 305 in system 1000 in FIG. 3.

The navigation base station 306 can be the same as described in the system 1000 in FIG. 3. In aspects where any of the other devices 101, 102, 103, 104, and 105 is an OGI camera, respective navigation base stations 306 can be located in the plant in which any of the devices 101, 102, 103, 104, and 105 (embodied as an OGI camera) are located.

The geographic position error correction device 307 can be the same as described in the system 1000 in FIG. 3. Respective geographic position error correction device 307 can be communicatively coupled with the navigation base stations 306 located in the plant in which any of the other devices 101, 102, 103, 104, and 105 embodied as an OGI camera is located.

The compliance auditing systems 1000 and 2000 in FIGS. 3 and 4 can be used for auditing the compliance data. The auditability of the apparatus and methods ensure that anyone coming in behind the operator will be able to audit the operations of and accuracy of the information without redoing any of the work. The operational data is saved as of the time of the picture or video being created by the camera, and ensures that each target location is marked and captures the relevant information for detection of a fugitive emission or confirmation of the absence of a fugitive emission.

A government worker, like an inspector from the EPA, can confirm compliance by viewing compliance data on the smart device 303 or smart device 403, as well as making sure the required time spent on each positively identified fugitive emission video is accurate and sufficiently captured.

The compliance auditing systems 1000 and 2000 utilize a repeatable process for creating the compliance data, which improves accountability for all aspects of the testing, monitoring, and detection of fugitive emissions.

FIG. 5 is a map of a plant 500, with a fugitive emission detection path taken (dashed lines) by an operator of the OGI camera 100. The plant 500 can optionally include multiple navigation base stations 306*a*, 306*b*, 306*c*, 306*d*, and 306*e* positioned in various locations in the plant 500. Also optionally included is a geographic position error correction device 307.

Prior to taking the fugitive emission detection path with the OGI camera 100, the navigation base stations 306*a*, 306*b*, 306*c*, 306*d*, and 306*e* can each be operated as described herein in survey-in mode to establish the geographic position for each of the navigation base stations 306*a*, 306*b*, 306*c*, 306*d*, and 306*e*. For example, a first base station 306*e* of the navigation base stations 306*a*, 306*b*, 306*c*, 306*d*, and 306*e* can connect or send an error correction signal to the OGI camera 100. The navigation base stations 306*a*, 306*b*, 306*c*, 306*d*, and 306*e* can communicate with one another via a base station network to determine the first base station 306*e* is communicating with the OGI camera 100. The other navigation base stations 306*a*, 306*b*, 306*c*, and 306*d* then can receive the first base station's 306*e* error correction data and transmit the same data as the respective navigation base station's 306*a*, 306*b*, 306*c*, and 306*d* signal. Multiple navigation base stations 306*a*, 306*b*, 306*c*, 306*d*, and 306*e* can be used for plants that are large in footprint, so that the OGI camera 100 can receive a strong signal from one of the multiple navigation base stations 306*a*, 306*b*, 306*c*, 306*d*, and 306*e* no matter the location of the OGI camera 100 in the plant 300. The navigation base stations 306*a*, 306*b*, 306*c*, 306*d*, and 306*e* may communicate and change the repeated signal to the navigation base station 306*a*, 306*b*, 306*c*, 306*d*, or 306*e* that is closest to the OGI camera 100 as the OGI camera 100 is moved along the fugitive emission detection path. The geographic position error correction device 307 can be utilized as described herein to reduce survey-in time of any of the navigation base stations 306*a*, 306*b*, 306*c*, 306*d*, and 306*e*. The navigation base stations 306*a*, 306*b*, 306*c*, 306*d*, and 306*e* can then be switched or configured to automatically switch from survey-in mode to error correction mode for operation of the OGI camera 100 in learning mode, operating mode, or both learning mode and operating mode.

The fugitive emission detection path can be created by an experienced user of the OGI camera 100 in a learning mode and followed by an operator (for purposes of image capture) of the OGI camera 100 in an operating mode. In aspects, the operator is not the same person as the experienced user. In additional aspects, the operator can have less experience than the experienced user, and an advantage of the OGI camera 100 disclosed herein is that the OGI camera 100 can guide a less experienced user to make meaningful image capture that is compliant with fugitive emission laws and regulations.

Learning Mode

In the learning mode, the operator can record/create a route that is the fugitive emission detection path through the plant 500, including observation points 1, 2, 3, 4, 5, and 6 for target objects 503, 506, 509, 512, 515, 517, and 520. In aspects, intermediate waypoints can be recorded/created, for safe navigation through the plant 500.

At each observation point 1, 2, 3, 4, 5, and 6, the operator of the OGI camera 100 in learning mode can orient the OGI camera 100 in specific positions at each observation point 1, 2, 3, 4, 5, and 6 relative to each target object 503, 506, 509, 512, 515, 517, and 520 in the plant 500. In learning mode, the following images and data are received by the SOM 201 for each target object 503, 506, 509, 512, 515, 517, and 520: positional data, pose data, and a visible light reference image.

In aspects of learning mode, positional data, distance data, pose data, or combinations thereof for each target object are measured during the learning mode of the OGI camera 100. Positional data (e.g., latitude and longitude data) can be received by the SOM 201 from the geographic positioning device 119 via sensor board 202. Distance data (e.g., distance of the OGI camera 100 from the target object) can be received by the SOM 201 from the LIDAR sensor 114 via sensor board 202. Pose data (e.g., orientation of the OGI camera 100 such as angle of the view of the MWIR camera 112 relative to horizontal) can be received by the SOM 201 from the IMU 117 via sensor board 202. The positional data, distance data, pose data, or combinations thereof are identified as reference positional data, reference distance data, and reference pose data and then are saved to memory by the SOM 201 of the OGI camera 100, for each target object 503, 506, 509, 512, 515, 517, and 520 at each observation point 1, 2, 3, 4, 5, and 6, to make up a complete plant route.

In learning mode, the visible light camera 113 also captures a visible light reference image of each target object 503, 506, 509, 512, 515, 517, and 520 at each observation point 1, 2, 3, 4, 5, and 6. The SOM 201 can identify the visible light image as a reference visible light image and save the captured reference visible light image to the memory of the SOM 201.

In learning mode, the vSLAM software 205 can create a reference association from the visible light image to later compare the visible light image to a later image captured in operating mode.

The SOM 201 can associate the reference association with the reference visible light image, the reference positional data, the reference pose data, the reference distance data, or combinations thereof. The SOM 201 can use the reference association to recall the reference image and reference data during operating mode for comparison with a subsequently captured image at a target object.

In aspects, the OGI camera 100 can tag and implement an alternative work practice (AWP) through the plant 500 via tagged target objects (e.g., flanges, valves, pipes, equipment, etc.) that need to be monitored for fugitive emissions. The AWP can be used as the route through the plant 500 for fugitive emissions detection with the OGI camera 100.

Operating Mode

The operating mode can be described with two sub-modes: navigation mode and detection mode. The operating mode and associated sub-modes shall be described with reference to images displayed on the viewfinder 116 of the OGI camera 100; however, it is contemplated that the images can be displayed on a smart device that is networked with the OGI camera 100.

In the navigation mode, navigation can be divided into two stages: 1) a first stage where the OGI camera 100 is configured to guide or navigate an operator of the OGI camera 100 to an observation point, and 2) a second stage where the OGI camera 100 is configured to guide or navigate the operator, while at the observation point, to orient and position the OGI camera 100 to a reference position and orientation relative to the target object so that fugitive emission detection is performed by the OGI camera 100 at the reference position and orientation for the target object.

A camera operator can cause the SOM 201 of the OGI camera 100 to enter the navigation mode, for example, via an input made via one or more of buttons 120 or via a touchscreen capability of the viewfinder 116.

In the first stage of the navigation mode, the OGI camera 100 can guide or navigate, via the viewfinder 116, the camera operator to move along the previously recorded route that is established in learning mode. More particularly, the SOM 201 of the OGI camera 100 can begin navigation by displaying on the viewfinder 116 the real-time image of the view of the visible light camera 113. The augmented reality software 206 running on the SOM 201 can add an augmented reality layer on top of the real-time image (also referred to as real-world image in real-time) displayed on the viewfinder 116.

The SOM 201 of the OGI camera 100 can next guide or navigate the operator to an observation point 1, 2, 3, 4, 5, or 6. The augmented reality software 206 can display one or more augmented reality objects in the augmented reality layer on the real-time image that is displayed on the viewfinder 116, to guide the operator to each individual observation point 1, 2, 3, 4, 5, and 6 based on the real-time positional data collected in operating mode compared with the reference positional data collected in learning mode. In aspects, the augmented reality software 206 uses the real-time positional data collected in operating mode compared with the reference positional data collected in learning mode to determine which augmented reality objects (e.g., an arrow pointing left, an arrow pointing right, an arrow pointing up, an arrow pointing down, or combinations thereof) that is/are displayed in the augmented reality layer on the viewfinder 116.

In the second stage of navigation, the SOM 201 of the OGI camera 100 can next guide or navigate the operator, while at the observation point 1, 2, 3, 4, 5, or 6, to point the MWIR camera 112 and visible light camera 113 of the OGI camera 100 to a target object at the observation point 1, 2, 3, 4, 5, or 6. With example of observation point 1 in FIG. 5, the SOM 201 of the OGI camera 100 can use real-time positional data, real-time pose data, real-time distance data, or combinations thereof collected in operating mode compared with the reference positional data, reference pose data, reference distance data, or combinations thereof that was/were collected in learning mode to display one or more augmented reality objects on the viewfinder 116 that can guide the operator to hold the OGI camera 100 in a correct position (i.e., pose position) for viewing the target object 503. In aspects, the OGI camera 100 can be configured to notify the operator (e.g., via an indicator on the viewfinder 116) when the real-time positional data, real-time pose data, real-time distance data, or combinations thereof matches or is within tolerance (e.g., +/−5% of reference values) with the reference positional data, reference pose data, reference distance data, or combinations thereof.

In aspects of the second stage of navigation, the SOM 201 can utilize the vSLAM software 205 to output a recommended pose adjustment (e.g., via the augmented reality objects) to the position and orientation of the OGI camera 100 based on at least signals and data received by the SOM 201 from the IMU 117 and the geographic position device 119 (e.g., real-time positional data, real-time pose data, real-time distance data, or combinations thereof in operating mode compared with the reference positional data, reference pose data, reference distance data, or combinations thereof that was/were collected in learning mode) and included in calculations made by the VSLAM software 205 to recommend the adjustments. The SOM 201 can display adjustments to the viewfinder 116 as one or more augmented reality objects on the augmented reality layer, and the user can view the one or more augmented reality objects on the viewfinder 116 and adjust the position and orientation of the OGI camera 100 relative to a target object 503, 506, 509, 512, 515, 517, or 520 at an observation point 1, 2, 3, 4, 5, or 6 as needed.

In aspects where multiple target objects are to be detected for fugitive emissions at a single observation point, the OGI camera 100 can perform the above procedure for each target object at the observation point. In aspects, the OGI camera 100 can be configured display a notification on the viewfinder 116 that multiple target objects need to be viewed at an observation point.

In some aspects, upon reaching an observation point 1, 2, 3, 4, 5, and 6, the SOM 201 of the OGI camera 100 can be configured receive the real-time positional data, real-time pose data, real-time distance data, or combinations thereof of the OGI camera 100, and compare the real-time positional data, real-time pose data, real-time distance data, or combinations thereof with previously saved reference positional data, reference pose data, reference distance data, or combinations thereof, and to determine a matching reference association for a reference visible light image of a target object. The matching reference visible light image can be retrieved from the memory of the SOM 201. The SOM 201 can be configured to switch the images displayed in the viewfinder 116 from the real-time image (e.g., the captured IR image, the captured visible light image, or the combined image) having the augmented reality layer thereon to the reference visible light image of the target object 503, 506, 509, 512, 515, 517, and 520 onto the viewfinder 116—aiding the camera operator to understand which target object is to be viewed at the observation point 1, 2, 3, 4, 5, or 6. After a set time period (e.g., 10 seconds) or after receiving an input (e.g., via buttons 120 or touchscreen of viewfinder 116) from the operator that the reference visible light image has been viewed, the SOM 201 of the OGI camera 100 is configured to switch the images displayed in the viewfinder 116 from the reference visible light image of the target object 503, 506, 509, 512, 515, 517, and 520 to the real-time images (e.g., the captured IR image, the captured visible light image, or the combined image) having the augmented reality layer thereon.

After the OGI camera 100 has navigated the operator to position and pose the OGI camera 100 at a real-time position that matches the reference position and reference pose, the camera operator can cause the SOM 201 of the OGI camera 100 to enter the detection mode, for example, via an input made via one or more of buttons 120 or via a touchscreen capability of the viewfinder 116. Alternatively, after the OGI camera 100 determines the real-time position of the OGI camera 100 matches a reference position, the OGI camera 100 can automatically enter the detection mode.

In the detection mode, the OGI camera 100 is configured to record the real-time images from the MWIR camera 112 and visible light camera 113, as well as all the real-time data from the components 114, 115, 117, and 119, and to combine all the data into compliance data that is i) saved to the memory of the SOM 201, ii) transmitted via the wireless transceiver 118, or both i) and ii). The processing of received data into metadata associated with images, and the processing of the images and metadata into the compliance data is the same as described herein.

After the compliance data is generated, the OGI camera 100 can enter back into the navigation mode, e.g., via operator input as described above, or automatically after compliance data for a target object is generated. The OGI camera 100 can then repeat the process of first stage and second stage navigation to another target object, and the OGI camera 100 then detect fugitive emissions at the other target object. The OGI camera 100 repeats the navigation mode and detection mode for each target object 503, 506, 509, 512, 515, 517, and 520 in a path in the plant 500, until the path is completed.

In aspects, the OGI camera 100 can generate compliance data for each target object after each target object is detected or after all target objects are detected for fugitive emissions.

Advantages of the disclosed OGI camera 100, methods for operating the OGI camera 100, and auditing systems 1000 and 2000 include:

1) the augmented reality software 206 of the OGI camera 100 can automatically display the augmented reality layer on real-time visible light images generated in a plant 500, and allow for real-time analysis and results to be stored (e.g., on a memory of the SOM 201, on a datastore of the central computer 302 in system 1000, or on a datastore of the central computer 402 in system 2000);
2) the OGI camera 100 can detect fugitive emissions of volatile organic compounds (VOCs) and hazardous air pollutants (HAPs) at concentrations equal to or greater than the fugitive emission detection threshold specified in a regulation;
3) the OGI camera 100 can be easily operated in operating mode by a qualified, yet less experienced operator, than the personnel who operates the OGI camera 100 in learning mode;
4) the OGI camera 100 can be detect fugitive emissions record weather and lighting conditions required by regulation to prove that detection was made according to regulatory requirements;
5) the OGI camera 100 operation in conjunction with the auditing systems 1000 or 2000 disclosed herein allow fugitive emission detection audits to be readily conducted at any time, and the auditing systems 1000 and 2000 allow users to easily input follow up action for any detected fugitive emissions, such as recording and saving that fugitive emissions detected have been repaired and associating the repair with the compliance data saved for a particular target object;
6) the auditing systems 1000 and 2000 keep records all detections, including the date, location, and results of the detection, as well as any repairs made as a result of the detection;
7) the accuracy of the position of the OGI camera 100 when utilizing error correction provided by the navigation base station 306 is improved from on a scale of a meter with use of the navigation base station 306 to a scale of a few centimeters with use of the navigation base station 306;
8) the survey-in time of the navigation base station 306 can be reduced from hours when operating survey-in mode without repeated use of the same base station mount to less than 30 second when using the same base station mount for the navigation base station 306 (e.g., the mount located in the plant 300); and
9) the survey-in time of the navigation base station 306 can be reduced from hours when operating survey-in mode without use of error correction data from the geographic position error correction device 307 to a few second when using the geographic position error correction device 307.

ADDITIONAL DESCRIPTION

Aspect 1. An optical gas imaging camera comprising: a housing; a digital encoder contained in the housing; a mid-wave infra-red (MWIR) camera contained in the housing and connected to the digital encoder, wherein the MWIR camera is configured to output a captured infrared image of a target object to the digital encoder; a visible light camera contained in the housing and connected to the digital encoder, wherein the visible light camera is configured to output a captured visible light image of the target object to the digital encoder; a system on module (SOM) contained in the housing; a light detection and ranging (LIDAR) sensor contained in the housing and configured to i) determine a distance between the target object and the optical gas imaging camera and ii) output a distance measurement signal containing distance data associated with the captured infrared image and the captured visible light image to the SOM; a temperature sensor contained in the housing and configured to i) measure a temperature at the optical gas imaging camera and ii) output a temperature signal containing temperature data associated with the captured infrared image and the captured visible light image to the SOM; an inertial measurement unit (IMU) contained in the housing and configured to i) determine an orientation of the optical gas imaging camera and ii) output an orientation signal containing pose data associated with the captured infrared image and the captured visible light image to the SOM; a geographic position device contained in the housing and configured to i) determine a geographic location or position of the optical gas imaging camera and ii) output a geographic position signal containing geographic position data associated with the captured infrared image and the captured visible light image to the SOM; wherein the SOM is configured to send the distance data, the temperature data, the pose data, and the geographic position data that are associated with the captured infrared image and the captured visible light image to the digital encoder, wherein the digital encoder is configured to i) encode a) the captured infrared image, b) the captured visible light image, and c) the distance data, the temperature data, the pose data, and the geographic position data that are associated with the captured infrared image and the captured visible light image into an encoded data, and ii) send the encoded data to the SOM.

Aspect 2. The optical gas imaging camera of Aspect 1, wherein the SOM is configured to receive the encoded data in real-time via an encoded data stream from the digital encoder or to receive the encoded data via an encoded data packet from the digital encoder.

Aspect 3. The optical gas imaging camera of Aspect 1 or Aspect 2, wherein the digital encoder is configured to compress and attach the distance data, the temperature data, the pose data, and the geographic position data as metadata for the captured infrared image and the captured visible light image.

Aspect 4. The optical gas imaging camera of any one of Aspects 1 to 3, further comprising: a viewfinder coupled to SOM and at least partially contained in the housing, wherein the viewfinder is configured to display the captured infrared image, the captured visible light image, or a combined image of the target object, wherein the digital encoder is further configured to, in real-time, i) adjust, combine, overlay, or combinations thereof, the captured infrared image of the target object and the captured visible light image of the target object, ii) generate the combined image based on i), and iii) send the combined image to the SOM, wherein the SOM is configured to output the combined image to the viewfinder in real-time.

Aspect 5. The optical gas imaging camera of any one of Aspects 1 to 4, wherein the SOM is further configured to: determine a localization of the optical gas imaging camera; compare the captured visible light image of the target object to a reference image of the target object; and determine an adjustment in a position of the optical gas imaging camera, an adjustment in a pose of the optical gas imaging camera, or an adjustment in both the position and the pose of the optical gas imaging camera.

Aspect 6. The optical gas imaging camera of Aspect 5, further comprising: a viewfinder coupled to the SOM and at least partially contained in the housing, wherein the viewfinder is configured to: display a real-time image comprising the captured infrared image of the target object, the captured visible light image of the target object, or a combined image of the target object; wherein the SOM is configured to generate an augmented reality layer on top of the real-time image, generate one or more augmented reality objects, and output the one or more augmented reality objects in the augmented reality layer for display in the viewfinder with the real-time image.

Aspect 7. The optical gas imaging camera of any one of Aspects 1 to 6, further comprising: a wireless transceiver at least partially contained in the housing and connected to the SOM, wherein the wireless transceiver is configured to receive an ambient condition data associated with a location of the target object, wherein the ambient condition data comprises a wind speed data from an anemometer, a weather condition data from a weather station, or both the wind speed data and the weather condition data, wherein the SOM is configured to send the ambient condition data to the digital encoder, wherein the digital encoder additionally encodes the ambient condition data into the encoded data.

Aspect 8. The optical gas imaging camera of any one of Aspects 1 to 7, wherein the SOM is further configured to send additional data to the digital encoder, wherein the additional data comprises: i) an operator identifier, ii) a camera identifier, iii) a target object identifier, iv) a date of image capture of the target object, v) a time of the image capture of the target object, vi) a name of a location of the target object, vii) an ambient temperature value, viii) a difference value between the temperature data and the ambient temperature value, ix) a yes or no indicator that the difference value is less than 0.5° C., x) calibration data including a most-recent date and time of a most-recent calibration of the optical gas imaging camera, a pass or fail indicator for the most-recent calibration, and a verification indicator whether or not the most-recent calibration meets a verification requirement, xi) a proof a verification check for the date that the captured infrared image was captured, xii) an operating mode of the optical gas imaging camera, xiii) whether a viewfinder or a peripheral smart device was utilized, xiv) a tag for the target object, xv) route tracing data, xvi) a length indicator for a time length of the captured infrared image, xvii) pose data, xviii) wind speed data, xix) weather condition data, xx) whether or not the distance data comprises a distance value that is greater than or less than a maximum allowed distance value, xxi) or combinations thereof; wherein the digital encoder is further configured to encode the additional data into the encoded data.

Aspect 9. The optical gas imaging camera of any one of Aspects 1 to 8, wherein: the captured infrared image and the captured visible light image are captured in real-time; the distance data, the temperature data, the pose data, and the geographic position data that are associated with the captured infrared image and the captured visible light image are determined or measured concurrently in real-time with the capture of the captured infrared image and the captured visible light image; the SOM sends the distance data, the temperature data, the pose data, and the geographic position data that are associated with the captured infrared image and the captured visible light image to the digital encoder in real-time; and the digital encoder encodes the encoded data and sends the encoded data to the SOM in real-time.

Aspect 10. The optical gas imaging camera of an one of Aspects 1 to 9, wherein: the visible light camera is connected to the SOM and is further configured to i) capture a reference visible light image of the target object and ii) send the reference visible light image to the SOM; the LIDAR sensor is further configured to i) determine a reference distance between the target object and the optical gas imaging camera and ii) output reference distance data containing the reference distance associated with the reference visible light image to the SOM; the IMU is further configured to i) determine a reference orientation of the optical gas imaging camera and ii) output reference pose data containing the reference orientation associated with the reference visible light image to the SOM; and the geographic position device is further configured to i) determine a reference geographic location or position of the optical gas imaging camera and ii) output the reference positional data containing the reference geographic location or position associated with the reference visible light image to the SOM.

Aspect 11. The optical gas imaging camera of Aspect 10, wherein the SOM is further configured to: determine a first stage comparison of the geographic position data with the reference positional data; and output, based on the first stage comparison, to a viewfinder or a computer device, one or more first augmented reality object on the captured visible light image, wherein the one or more first augmented reality object is indicative of a direction to an observation point for the target object relative to a geographic position of the optical gas imaging camera.

Aspect 12. The optical gas imaging camera of Aspect 11, wherein the SOM is further configured to: determine a second stage comparison of i) the geographic position data with the reference positional data, ii) the pose data with the reference pose data, iii) the distance data with the reference distance data, or iv) combinations thereof; and output, based on the second stage comparison, to a viewfinder or the computer device while at the observation point for the target object, one or more second augmented reality object on the captured visible light image, wherein the one or more second augmented reality object is indicative of a pose adjustment of the optical gas imaging camera at the observation point.

Aspect 13. The optical gas imaging camera of any one of Aspects 1 to 12, further comprising: a wireless transceiver connected to the SOM and configured to transmit compliance data comprising the encoded data to a central computer.

Aspect 14. The optical gas imaging camera of any one of Aspects 1 to 13, further comprising: a wireless transceiver connected to the SOM and configured to receive geographic position error correction data from a navigation base station and send the geographic position error correction data to the SOM; wherein the SOM is further configured to apply the geographic position error correction data to determine the geographic location or position of the optical gas imaging camera.

Aspect 15. An optical gas imaging camera comprising: a housing; a mid-wave infra-red (MWIR) camera contained in the housing, wherein the MWIR camera captures a captured infrared image of a target object; a visible light camera contained in the housing, wherein the visible light camera i) captures, at a first time, a reference visible light image of the target object and ii) captures, at a second time that is after the first time, a captured visible light image of the target object; a light detection and ranging (LIDAR) sensor contained in the housing, wherein the LIDAR sensor i) determines, at the first time, a reference distance between the target object and the optical gas imaging camera and ii) determines, at the second time, an operating distance between the target object and the optical gas imaging camera; an inertial measurement unit (IMU) contained in the housing, wherein the IMU i) determines, at the first time, a reference pose of the optical gas imaging camera and ii) determines, at the second time, an operating pose of the optical gas imaging camera; a geographic position device contained in the housing, wherein the geographic position device i) determines, at the first time, a reference geographic location or position of the optical gas imaging camera and ii) determines, at the second time, an operating geographic location or position of the optical gas imaging camera; and a system on module (SOM) contained in the housing and coupled to the MWIR camera, the visible light camera, the LIDAR sensor, the IMU, and the geographic position device.

Aspect 16. The optical gas imaging camera of Aspect 15, wherein the SOM: determines a first stage comparison of the operating geographic location or position with the reference geographic location or position; and output, based on the first stage comparison, to a viewfinder of the optical gas imaging camera or a computer device networked with the optical gas imaging camera, one or more first augmented reality object on the captured visible light image, wherein the one or more first augmented reality object is indicative of a direction to an observation point for the target object relative to a geographic position of the optical gas imaging camera.

Aspect 17. The optical gas imaging camera of Aspect 16, wherein the SOM: determines a second stage comparison of i) the operating geographic location or position with the reference geographic location or position, ii) the operating pose with the reference pose, iii) the operating distance with the reference distance, or iv) combinations thereof; and output, based on the second stage comparison, to the viewfinder or the computer device while at the observation point for the target object, one or more second augmented reality object on the captured visible light image, wherein the one or more second augmented reality object is indicative of a pose adjustment of the optical gas imaging camera at the observation point.

Aspect 18. An optical gas imaging camera comprising: a housing; a visible light camera contained in the housing and configured to i) capture, at a first time, a reference visible light image of a target object and ii) capture, at a second time that is after the first time, a captured visible light image of the target object; a geographic position device contained in the housing and configured to i) determine, at the first time, a reference geographic location or position of the optical gas imaging camera and ii) determine, at the second time that is later than the first time, an operating geographic location or position of the optical gas imaging camera; and a system on module (SOM) contained in the housing and connected to the geographic position device and configured to: determine a first stage comparison of the reference geographic location or position with the operating geographic location or position; and output, based on the first stage comparison, to a viewfinder or a computer device networked with the optical gas imaging camera, one or more first augmented reality object on the captured visible light image, wherein the one or more first augmented reality object is indicative of a direction to an observation point for a target object relative to the operating geographic location or position of the optical gas imaging camera.

Aspect 19. The optical gas imaging camera of Aspect 18, further comprising: a light detection and ranging (LIDAR) sensor contained in the housing and configured to i) determine, at the first time, a reference distance between the target object and the optical gas imaging camera and ii) determine, at the second time, an operating distance between the target object and the optical gas imaging camera; an inertial measurement unit (IMU) contained in the housing and configured to i) determine, at the first time, a reference pose of the optical gas imaging camera and ii) determine, at the second time, an operating pose of the optical gas imaging camera; wherein the SOM is further configured to: determine a second stage comparison of i) the operating geographic location or position with the reference geographic location or position, ii) the reference pose of the optical gas imaging camera with the operating pose, iii) the reference distance with the operating distance, or iv) combinations thereof; and output, based on the second stage comparison, to the viewfinder or the computer device while at the observation point for the target object, one or more second augmented reality object on the captured visible light image, wherein the one or more second augmented reality object is indicative of a pose adjustment of the optical gas imaging camera at the observation point.

Aspect 20. A compliance auditing system comprising: a central computer; and the optical gas imaging camera of any one of Aspects 1 to 19 that is networked with the central computer; wherein the optical gas imaging camera is configured to wirelessly transmit compliance data comprising the encoded data to the central computer, wherein the central computer is configured to receive the compliance data from the optical gas imaging camera and store the compliance data in a memory of the central computer.

Aspect 21. The compliance auditing system of Aspect 20, further comprising: a smart device networked with the central computer, wherein the smart device is configured to request the compliance data from the central computer; wherein, based upon the request, the central computer is configured to send the compliance data to the smart device, wherein the smart device is configured to display the compliance data.

Aspect 22. The compliance auditing system of Aspect 20 or Aspect 21, further comprising: a navigation base station configured to i) determine geographic position error correction data and ii) send the geographic position error correction data to the optical gas imaging camera, wherein the optical gas imaging camera is configured to receive the geographic position error correction data and apply the geographic position error correction data to determine a geographic location or position of the optical gas imaging camera.

Aspect 23. The compliance auditing system of Aspect 22, further comprising: a geographic position error correction device configured to transmit the geographic position error correction data to the navigation base station.

Aspect 24. The compliance auditing system of any one of Aspects 20 to 23, further comprising: one or more devices networked with the central computer, wherein each of the one or more devices is configured to generate and wirelessly transmit additional data to the central computer, wherein the central computer is configured to receive and store the additional data.

Aspect 25. The compliance auditing system of Aspect 24, wherein the one or more devices comprises another optical gas imaging camera, a laptop, a smartphone, an aerial surveillance device, a methane sensor, or combinations thereof.

Aspect 26. An optical gas imaging system comprising: an optical gas imaging camera; and a navigation base station configured to i) determine geographic position error correction data and ii) send the geographic position error correction data to the optical gas imaging camera, wherein the optical gas imaging camera is configured to receive the geographic position error correction data and apply the geographic position error correction data to determine a geographic location or position of the optical gas imaging camera. The optical gas imagine camera can be the optical gas imaging camera of any one of Aspects 1 to 19.

Aspect 27. The optical gas imaging system of Aspect 26, further comprising: a geographic position error correction device configured to transmit the geographic position error correction data to the navigation base station.

Aspect 28. The optical gas imaging system of Aspect 26 or Aspect 27, wherein the geographic location is determined with an error of 2.5 cm or less.

Aspect 29. A geographic positioning assistance system for an optical gas imaging camera, the system comprising: a navigation base station configured to i) determine geographic position error correction data and ii) send the geographic position error correction data to the optical gas imaging camera.

Aspect 30. The geographic positioning assistance system of Aspect 29, further comprising: a geographic position error correction device configured to transmit the geographic position error correction data to the navigation base station.

Aspect 31. A method comprising: capturing, by an optical gas imaging camera, an infrared image and a visible light image of a target object; determining, by the optical gas imaging camera, a distance data between the target object and the optical gas imaging camera; measuring, by the optical gas imaging camera, a temperature data at the optical gas imaging camera; determining, by the optical gas imaging camera, pose data of the optical gas imaging camera; determining, by the optical gas imaging camera, geographic position data of the optical gas imaging camera; and encoding, by the optical gas imaging camera, the captured infrared image, the captured visible light image, the distance data, the temperature data, the pose data, and the geographic position data into an encoded data stream or encoded data packet; wherein each of the distance data, the temperature data, the pose data, and the geographic position data is associated with the captured infrared image and the captured visible light image. The method improves fugitive emission detection because a single device (the OGI camera) can capture and create fugitive emission detection data so that the fugitive emission detection data captured at one point in time is packaged into compliance data that can be retrieved and audited at a later point in time when proof of compliance with reporting requirements is needed.

Aspect 32. The method of Aspect 31, performed in real-time by the optical gas imaging camera.

Aspect 33. The method of Aspect 31 or Aspect 32, further comprising: generating, in real-time by the optical gas imaging camera, a combined image by adjusting, combining, overlaying, or combinations thereof, the captured infrared image of the target object and the captured visible light image of the target object; and displaying, in real-time by the optical gas imaging camera, the captured infrared image, the captured visible light image, or the combined image of the target object.

Aspect 34. The method of any one of Aspects 31 to 33, further comprising: determining, by the optical gas imaging camera, a localization of the optical gas imaging camera; comparing, by the optical gas imaging camera, the captured visible light image of the target object to a reference visible light image of the target object; and determining, by the optical gas imaging camera, an adjustment in a position of the optical gas imaging camera, an adjustment in a pose of the optical gas imaging camera, or an adjustment in both the position and the pose of the optical gas imaging camera.

Aspect 35. The method of Aspect 34, further comprising: displaying, by the optical gas imaging camera, a real-time image comprising the captured infrared image of the target object, the captured visible light image of the target object, or a combined image of the target object; generating, by the optical gas imaging camera, an augmented reality layer on top of the real-time image; generating, by the optical gas imaging camera, augmented reality objects; and displaying, by the optical gas imaging camera, one or more augmented reality objects in the augmented reality layer with the real-time image.

Aspect 36. The method of any one of Aspects 31 to 35, further comprising: receive, by the optical gas imaging camera, an ambient condition data associated with a location of the target object, wherein the ambient condition data comprises a wind speed data from an anemometer, a weather condition data from a weather station, or both the wind speed data and the weather condition data; encoding, by the optical gas imaging camera, the ambient condition data into the encoded data.

Aspect 37. The method of any one of Aspects 31 to 36, further comprising: encoding, by the optical gas imaging camera, additional data into the encoded data, wherein the additional data comprises: i) an operator identifier, ii) a camera identifier, iii) a target object identifier, iv) a date of image capture of the target object, v) a time of the image capture of the target object, vi) a name of a location of the target object, vii) an ambient temperature value, viii) a difference value between the temperature data and the ambient temperature value, ix) a yes or no indicator that the difference value is less than 0.5° C., x) calibration data including a most-recent date and time of a most-recent calibration of the optical gas imaging camera, a pass or fail indicator for the most-recent calibration, and a verification indicator whether or not the most-recent calibration meets a verification requirement, xi) a proof a verification check for the date that the captured infrared image was captured, xii) an operating mode of the optical gas imaging camera, xiii) whether a viewfinder or a peripheral smart device was utilized, xiv) a tag for the target object, xv) route tracing data, xvi) a length indicator for a time length of the captured infrared image, xvii) pose data, xviii) wind speed data, xix) weather condition data, xx) whether or not the distance data comprises a distance value that is greater than or less than a maximum allowed distance value, xxi) or combinations thereof.

Aspect 38. The method of any one of Aspects 31 to 37, wherein: the captured infrared image and the captured visible light image are captured in real-time; the distance data, the temperature data, the pose data, and the geographic position data that are associated with the captured infrared image and the captured visible light image are determine or measured concurrently in real-time with the capture of the captured infrared image and the captured visible light image; and the encoding occurs in real-time.

Aspect 39. The method of any one of Aspects 31 to 38, further comprising: capturing, by the optical gas imaging camera, a reference visible light image of the target object; determining, by the optical gas imaging camera, a reference distance data between the target object and the optical gas imaging camera; determining, by the optical gas imaging camera, a reference pose data of the optical gas imaging camera; and determining, by the optical gas imaging camera, a reference geographic location or position of the optical gas imaging camera; wherein each of the reference distance data, the reference pose data, and the reference geographic location or position is associated with the reference visible light image.

Aspect 40. The method of Aspect 39, further comprising: determining, by the optical gas imaging camera, a first stage comparison of the geographic position data with the reference geographic location or position; and based on the first stage comparison, outputting or displaying, by the optical gas imaging camera to a viewfinder or a computer device connected to the optical gas imaging camera, one or more first augmented reality object on the captured visible light image, wherein the one or more first augmented reality object is indicative of a direction to an observation point for the target object relative to a geographic position of the optical gas imaging camera. The method of Aspect 40 improves fugitive emission detection because the optical gas imaging camera can capture fugitive emission detection data at one point in time (a reference time) and retrieve the data for comparison with fugitive emission detection data captured at a later point in time to direct a user of the OGI camera to the observation point for the target object.

Aspect 41. The method of Aspect 40, further comprising: determining, by the optical gas imaging camera, a second stage comparison of i) the geographic position data with the reference geographic location or position, ii) the pose data with the reference pose data, iii) the distance data with the reference distance data, or iv) combinations thereof; and based on the second stage comparison, outputting or displaying, by the optical gas imaging camera to the viewfinder or the computer device while at the observation point for the target object, one or more second augmented reality object on the captured visible light image, wherein the one or more second augmented reality object is indicative of a pose adjustment of the optical gas imaging camera at the observation point. The method of Aspect 41 improves fugitive emission detection because the OGI camera can capture and create fugitive emission detection data at one point in time (a reference time) and retrieve the data for comparison with fugitive emission detection data captured at a later point in time to direct a user of the OGI camera to a correct pose of the OGI camera once the user is at the observation point for the target object.

Aspect 42. The method of any one of Aspects 31 to 41, further comprising: transmitting, by the optical gas imaging camera, compliance data comprising the encoded data to a central computer.

Aspect 43. A method comprising: capturing, by an optical gas imaging camera, an infrared image of a target object; capturing, by the optical gas imaging camera at a first time, a reference visible light image of the target object; capturing, by the optical gas imaging camera at a second time that is after the first time, a captured visible light image of the target object; determining, by the optical gas imaging camera at the first time, a reference distance between the target object and the optical gas imaging camera, a reference pose of the optical gas imaging camera, and a reference geographic location or position of the optical gas imaging camera; and determining, by the optical gas imaging camera at the second time, an operating distance between the target object and the optical gas imaging camera, an operating pose of the optical gas imaging camera, and an operating geographic location or position of the optical gas imaging camera.

Aspect 44. The method of Aspect 43, further comprising: determining, by the optical gas imaging camera, a first stage comparison of the operating geographic location or position with the reference geographic location or position; and based on the first stage comparison, outputting or displaying, by the optical gas imaging camera to a viewfinder or a computer device connected to the optical gas imaging camera, one or more first augmented reality object on the captured visible light image, wherein the one or more first augmented reality object is indicative of a direction to an observation point for the target object relative to a geographic position of the optical gas imaging camera. The method of Aspect 44 improves fugitive emission detection because the OGI camera can capture fugitive emission detection data at one point in time (a reference time) and retrieve the data for comparison with fugitive emission detection data captured at a later point in time to direct a user of the OGI camera to the observation point for the target object.

Aspect 45. The method of Aspect 44, further comprising: determining, by the optical gas imaging camera, a second stage comparison of i) the operating geographic location or position with the reference geographic location or position, ii) the operating pose with the reference pose, iii) the operating distance with the reference distance, or iv) combinations thereof; and based on the second stage comparison, outputting or displaying, by the optical gas imaging camera to the viewfinder or the computer device while at the observation point for the target object, one or more second augmented reality object on the captured visible light image, wherein the one or more second augmented reality object is indicative of a pose adjustment of the optical gas imaging camera at the observation point. The method of Aspect 45 improves fugitive emission detection because the OGI camera can capture and create fugitive emission detection data at one point in time (a reference time) and retrieve that data for comparison with fugitive emission detection data at a later point in time to direct a user of the OGI camera to a correct pose of the OGI camera once the user is at the observation point for the target object.

Aspect 46. A method comprising: determining, by an optical gas imaging camera, a first stage comparison of a reference geographic location or position of the optical gas imaging camera determined at a first time with an operating geographic location or position of the optical gas imaging camera determined at a second time that is later than the first time; and based on the first stage comparison, outputting or displaying, by the optical gas imaging camera to a viewfinder or a computer device connected to the optical gas imaging camera, one or more first augmented reality object on a captured visible light image, wherein the one or more first augmented reality object is indicative of a direction to an observation point for a target object relative to a geographic position of the optical gas imaging camera. The method of Aspect 46 improves fugitive emission detection because the OGI camera can capture fugitive emission detection data at one point in time (a reference time) and retrieve the data for comparison with fugitive emission detection data captured at a later point in time to direct a user of the OGI camera to the observation point for the target object.

Aspect 47. The method of Aspect 46, further comprising: determining, by the optical gas imaging camera, a second stage comparison of i) the operating geographic location or position with the reference geographic location or position, ii) a reference pose of the optical gas imaging camera determined at the first time with an operating pose of the optical gas imaging camera determined at the second time, iii) a reference distance data between the optical gas imaging camera and the target object determined at the first time with an operating distance data between the optical gas imaging camera and the target object determined at the second time, or iv) combinations thereof; and based on the second stage comparison, outputting or displaying, by the optical gas imaging camera to the viewfinder or the computer device while at the observation point for the target object, one or more second augmented reality object on the captured visible light image, wherein the one or more second augmented reality object is indicative of a pose adjustment of the optical gas imaging camera at the observation point. The method of Aspect 47 improves fugitive emission detection because the OGI camera can capture and create fugitive emission detection data at one point in time (a reference time) and retrieve that data for comparison with fugitive emission detection data at a later point in time to direct a user of the OGI camera to a correct pose of the OGI camera once the user is at the observation point for the target object.

Aspect 48. A method for operating a fugitive emissions compliance system, the method comprising: encoding, by an optical gas imaging camera, a captured infrared image, a captured visible light image, distance data, temperature data, pose data, and geographic position data into an encoded data stream or encoded data packet, transmitting, by an optical gas imaging camera, compliance data comprising the encoded data stream or the encoded data packet to a central computer; receiving, by the central computer, the compliance data from the optical gas imaging camera; and storing, by the central computer, the compliance data. The method improves fugitive emission detection because a single device (the OGI camera) can capture and create fugitive emission detection data in a manner that is repeatable and send fugitive emission data in a compliance-ready standard form to a central computer where the data is stored for ready access when proof of compliance with reporting requirements is needed.

Aspect 49. The method of Aspect 48, further comprising: receiving, by the central computer from a smart device, a request for the compliance data; and upon receiving the request, sending, by the central computer, the compliance data to the smart device.

Aspect 50. The method of Aspect 48 or Aspect 49, further comprising: receiving, by the central computer, additional data from one or more devices that are networked with the central computer.

Aspect 51. A method comprising: determining, by a navigation base station, a geographic position error correction data; and sending, by the navigation base station, the geographic position error correction data to an optical gas imaging camera. The method of Aspect 51 improves fugitive emission detection because sending geographic position error correction data to the optical gas imaging camera allows the camera to determine a geographic position within a few centimeters of error.

Aspect 52. The method of Aspect 51, further comprising: receiving, by the navigation base station, the geographic position error correction data from a geographic position error correction device.

Aspect 53. The method of Aspect 51 or Aspect 52, further comprising: applying, by the optical gas imaging camera, the geographic position error correction data to determine a geographic location or position of the optical gas imaging camera.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
capturing, by an optical gas imaging camera, an infrared image and a visible light image of a target object;
determining, by the optical gas imaging camera, a distance data between the target object and the optical gas imaging camera;
measuring, by the optical gas imaging camera, a temperature data at the optical gas imaging camera;
determining, by the optical gas imaging camera, of the optical gas imaging camera;
determining, by the optical gas imaging camera, geographic position data of the optical gas imaging camera; and
encoding, by the optical gas imaging camera, the captured infrared image, the captured visible light image, the distance data, the temperature data, and the geographic position data into an encoded data stream or encoded data packet;
wherein each of the distance data, the temperature data, and the geographic position data is associated with the captured infrared image and the captured visible light image.

2. The method of claim 1, performed in real-time by the optical gas imaging camera.

3. The method of claim 1, further comprising:
generating, in real-time by the optical gas imaging camera, a combined image by adjusting, combining, overlaying, or combinations thereof, the captured infrared image of the target object and the captured visible light image of the target object; and
displaying, in real-time by the optical gas imaging camera, the captured infrared image, the captured visible light image, or the combined image of the target object.

4. The method of claim 1, further comprising:
displaying, by the optical gas imaging camera, a real-time image comprising the captured infrared image of the target object, the captured visible light image of the target object, or a combined image of the target object;
generating, by the optical gas imaging camera, an augmented reality layer on top of the real-time image;
generating, by the optical gas imaging camera, augmented reality objects; and
displaying, by the optical gas imaging camera, one or more augmented reality objects in the augmented reality layer with the real-time image.

5. The method of claim 1, further comprising:
receiving, by the optical gas imaging camera, an ambient condition data associated with a location of the target object, wherein the ambient condition data comprises a wind speed data from an anemometer, a weather condition data from a weather station, or both the wind speed data and the weather condition data; and
encoding, by the optical gas imaging camera, the ambient condition data into the encoded data.

6. The method of claim 1, further comprising:
encoding, by the optical gas imaging camera, additional data into the encoded data, wherein the additional data comprises:
i) an operator identifier, ii) a camera identifier, iii) a target object identifier, iv) a date of image capture of the target object, v) a time of the image capture of the target object, vi) a name of a location of the target object, vii) an ambient temperature value, viii) a difference value between the temperature data and the ambient temperature value, ix) a yes or no indicator that the difference value is less than 0.5° C., x) calibration data including a most-recent date and time of a most-recent calibration of the optical gas imaging camera, a pass or fail indicator for the most-recent calibration, and a verification indicator whether or not the most-recent calibration meets a verification requirement, xi) a proof a verification check for the date that the captured infrared image was captured, xii) an operating mode of the optical gas imaging camera, xiii) whether a viewfinder or a peripheral smart device was utilized, xiv) a tag for the target object, xv) route tracing data, xvi) a length indicator for a time length of the captured infrared image, xvii) wind speed data, xviii) weather condition data, xix) whether or not the distance data comprises a distance value that is greater than or less than a maximum allowed distance value, xx) or combinations thereof.

7. The method of claim 1, wherein:
the captured infrared image and the captured visible light image are captured in real-time;
the distance data, the temperature data, and the geographic position data that are associated with the captured infrared image and the captured visible light image are determined or measured concurrently in real-time with the capture of the captured infrared image and the captured visible light image; and
the encoding occurs in real-time.

8. The method of claim 1, further comprising:
capturing, by the optical gas imaging camera, a reference visible light image of the target object;
determining, by the optical gas imaging camera, a reference distance data between the target object and the optical gas imaging camera; and
determining, by the optical gas imaging camera, a reference geographic location or position of the optical gas imaging camera;
wherein each of the reference distance data and the reference geographic location or position is associated with the reference visible light image.

9. The method of claim 8, further comprising:
determining, by the optical gas imaging camera, a first stage comparison of the geographic position data with the reference geographic location or position; and
based on the first stage comparison, outputting or displaying, by the optical gas imaging camera to a viewfinder or a computer device connected to the optical gas imaging camera, one or more first augmented reality object on the captured visible light image, wherein the one or more first augmented reality object is indicative of a direction to an observation point for the target object relative to a geographic position of the optical gas imaging camera.

10. The method of claim 9, further comprising:
determining, by the optical gas imaging camera, a second stage comparison of i) the geographic position data with the reference geographic location or position, ii) the distance data with the reference distance data, or iii) combinations thereof; and
based on the second stage comparison, outputting or displaying, by the optical gas imaging camera to the viewfinder or the computer device while at the observation point for the target object, one or more second augmented reality object on the captured visible light image.

11. The method of claim 1, further comprising:

transmitting, by the optical gas imaging camera, compliance data comprising the encoded data to a central computer.

12. A method comprising:

capturing, by an optical gas imaging camera, an infrared image of a target object;

capturing, by the optical gas imaging camera at a first time, a reference visible light image of the target object;

capturing, by the optical gas imaging camera at a second time that is after the first time, a captured visible light image of the target object;

determining, by the optical gas imaging camera at the first time, a reference distance between the target object and the optical gas imaging camera, and a reference geographic location or position of the optical gas imaging camera; and determining, by the optical gas imaging camera at the second time, an operating distance between the target object and the optical gas imaging camera, and an operating geographic location or position of the optical gas imaging camera.

13. The method of claim 12, further comprising:

determining, by the optical gas imaging camera, a first stage comparison of the operating geographic location or position with the reference geographic location or position; and based on the first stage comparison, outputting or displaying, by the optical gas imaging camera to a viewfinder or a computer device connected to the optical gas imaging camera, one or more first augmented reality object on the captured visible light image, wherein the one or more first augmented reality object is indicative of a direction to an observation point for the target object relative to a geographic position of the optical gas imaging camera.

14. The method of claim 13, further comprising:

determining, by the optical gas imaging camera, a second stage comparison of i) the operating geographic location or position with the reference geographic location or position, ii) the operating distance with the reference distance, or iii) a combination thereof; and based on the second stage comparison, outputting or displaying, by the optical gas imaging camera to the viewfinder or the computer device while at the observation point for the target object, one or more second augmented reality object on the captured visible light image, wherein the one or more second augmented reality object is indicative of a pose adjustment of the optical gas imaging camera at the observation point.

15. A method for operating a fugitive emissions compliance system, the method comprising:

encoding, by an optical gas imaging camera, a captured infrared image, a captured visible light image, distance data, temperature data, and geographic position data into an encoded data stream or encoded data packet;

transmitting, by an optical gas imaging camera, compliance data comprising the encoded data stream or the encoded data packet to a central computer;

receiving, by the central computer, the compliance data from the optical gas imaging camera; and storing, by the central computer, the compliance data.

16. The method of claim 15, further comprising:

receiving, by the central computer from a smart device, a request for the compliance data; and upon receiving the request, sending, by the central computer, the compliance data to the smart device.

17. The method of claim 15, further comprising:

receiving, by the central computer, additional data from one or more devices that are networked with the central computer.

* * * * *